and issued in corresponding European Patent Application No. 04733156.

(12) United States Patent
Sasagawa et al.

(10) Patent No.: US 7,807,241 B2
(45) Date of Patent: Oct. 5, 2010

(54) HYDROGENATED COPOLYMER-CONTAINING LAMINATE

(75) Inventors: Masahiro Sasagawa, Yokohama (JP); Katsumi Suzuki, Kawasaki (JP); Toshinori Shiraki, Yamato (JP); Jae Yeon Lee, Busan (KR); Jun Choi Pil, Busan (KR); Suk Hun Sur, Busan (KR); Dae Shik Kim, Busan (KR)

(73) Assignee: Asahi Kasei Chemicals Corporation, Tokyo (JP)

( * ) Notice: Subject to any disclaimer, the term of this patent is extended or adjusted under 35 U.S.C. 154(b) by 1054 days.

(21) Appl. No.: 10/556,912

(22) PCT Filed: May 14, 2004

(86) PCT No.: PCT/JP2004/006890
§ 371 (c)(1),
(2), (4) Date: Jun. 27, 2006

(87) PCT Pub. No.: WO2004/101269

PCT Pub. Date: Nov. 25, 2004

(65) Prior Publication Data
US 2008/0118750 A1 May 22, 2008

(30) Foreign Application Priority Data

| May 15, 2003 | (JP) | ............................ 2003-136665 |
| May 15, 2003 | (JP) | ............................ 2003-136920 |
| Sep. 11, 2003 | (JP) | ............................ 2003-319149 |

(51) Int. Cl.
| B32B 27/08 | (2006.01) |
| B32B 27/12 | (2006.01) |
| B32B 27/30 | (2006.01) |
| B32B 27/32 | (2006.01) |
| B32B 27/38 | (2006.01) |

(52) U.S. Cl. ..................... 428/35.4; 428/35.2; 428/35.7; 428/36.1; 428/36.4; 428/36.5; 428/36.6; 428/36.8; 428/36.9; 428/36.91; 428/517; 428/518; 428/519; 428/521; 428/523

(58) Field of Classification Search ................ 428/34.1, 428/35.7, 36.1, 36.2, 36.4, 36.5, 36.6, 36.7, 428/36.8, 36.9, 36.91, 515–517, 519, 521, 428/523, 292.2, 297.4, 300.7, 301.4, 304.4, 428/35.2, 35.4, 518
See application file for complete search history.

(56) References Cited

U.S. PATENT DOCUMENTS 6,166,143 A * 12/2000 Watanabe et al. ............ 525/208

FOREIGN PATENT DOCUMENTS

| EP | 0 857 758 | 8/1998 |
| EP | 0 863 184 | 9/1998 |
| EP | 0 942 044 | 9/1999 |
| JP | 4-356577 | 12/1992 |
| JP | 2001-19827 | 1/2001 |
| JP | 2001019827 | * 1/2001 |
| JP | 2002-96426 | 4/2002 |
| JP | 2002-363247 | 12/2002 |
| JP | 2003-246910 | 9/2003 |
| JP | 2004-67798 | 3/2004 |

OTHER PUBLICATIONS

Supplementary European Search Report, mailed Apr. 12, 2007 and issued in corresponding European Patent Application No. 04733156.6-2124.

* cited by examiner

*Primary Examiner*—Rena L Dye
*Assistant Examiner*—Walter B Aughenbaugh
(74) *Attorney, Agent, or Firm*—Staas & Halsey LLP

(57) ABSTRACT

A hydrogenated copolymer-containing laminate comprising a substrate layer, an adhesive layer, and a hydrogenated copolymer composition layer which is laminated on and bonded to the substrate layer through the adhesive layer, the hydrogenated copolymer composition layer comprising a hydrogenated copolymer (I), and a rubbery polymer (II), wherein the hydrogenated copolymer (I) is obtained by hydrogenating a conjugated diene/vinyl aromatic compound copolymer, the hydrogenated copolymer (I) having the following characteristics (1) to (4): (1) a vinyl aromatic monomer unit content of from more than 50% by weight to 90% by weight, (2) a content of a vinyl aromatic polymer block of not more than 40% by weight, (3) a weight average molecular weight of from 50,000 to 1,000,000, and (4) a hydrogenation ratio of 70% or more, as measured with respect to the double bonds in conjugated diene monomer units.

11 Claims, No Drawings

HYDROGENATED COPOLYMER-CONTAINING LAMINATE

This application is based on and hereby claims priority to International Application No. PCT/JP2004/006890 filed on May 14, 2004; Japanese. Application No. 2003-136920 filed on May 15, 2003; Japanese Application No. 2003-136665 filed on May 15, 2003; and Japanese Application No. 2003-319149 filed on Sep. 11, 2003; the contents of which are hereby incorporated by reference.

BACKGROUND OF THE INVENTION

1. Field of the Invention

The present invention relates to a hydrogenated copolymer-containing laminate. More particularly, the present invention is concerned with a hydrogenated copolymer-containing laminate comprising: a substrate layer comprising a fibrous material, an adhesive layer, and a hydrogenated copolymer composition layer which is laminated on and bonded to the substrate layer through the adhesive layer, the hydrogenated copolymer composition layer comprising a specific amount of a hydrogenated copolymer (I), and a specific amount of a rubbery polymer (II) exclusive of the hydrogenated copolymer (I), wherein the hydrogenated copolymer (I) is obtained by hydrogenating a copolymer comprising conjugated diene monomer units and vinyl aromatic monomer units, a part of the vinyl aromatic monomer units optionally forming at least one vinyl aromatic polymer block, the hydrogenated copolymer (I) having specific characteristics with respect to a vinyl aromatic monomer unit content, a content of the vinyl aromatic polymer block, a weight average molecular weight, and a hydrogenation ratio. The hydrogenated copolymer-containing laminate of the present invention has various excellent properties which are equivalent to or higher than those of a vinyl chloride resin sheet. Specifically, the hydrogenated copolymer-containing laminate of the present invention has excellent properties with respect to flexibility, calendar-moldability, soft feeling at low temperatures (i.e., low temperature property), anti-blocking property (i.e., resistance to adhesion phenomena (which is generally referred to as "blocking") wherein when, for example, stacked resin shaped articles or a rolled resin film (which have or has resin surfaces which are in contact with each other) are or is stored for a long time, unfavorably strong adhesion occurs between the resin surfaces, so that it becomes difficult to separate the resin surfaces from each other), heat resistance, abrasion resistance, scratch resistance, impact resilience and the like. Therefore, the hydrogenated copolymer-containing laminate of the present invention can be advantageously used as a substitute for a vinyl chloride resin sheet. For example, the hydrogenated copolymer-containing laminate of the present invention can be advantageously used as artificial leathers (especially, skins for furniture, materials for interior of automobiles, shoe uppers, materials for bags, and skins for building materials).

2. Prior Art

Conventionally, a vinyl chloride resin has been widely used in the various fields, such as a material for embossed sheets and artificial leathers (especially, skins for furniture, materials for interior of automobiles, shoe uppers, materials for bags). The hardness and dynamic properties (such as tensile strength at break) of a vinyl chloride resin can be adjusted over a wide range by adjusting the amount of plasticizer, filler or the like, and it is possible to produce a vinyl chloride resin having excellent flexibility, abrasion resistance and scratch resistance. However, from the viewpoint of reducing the weight of the materials used in the above-mentioned fields and the recent concern for a load placed on the environment when the materials are burned or decomposed, there has been an increasing demand for a substitute for a vinyl chloride resin. As examples of candidates for substitutes for a vinyl chloride resin, there can be mentioned olefin resins, ethylene-vinyl acetate copolymers, ethylene-acrylic ester copolymers, and styrene block copolymers.

Among these, olefin resins (such as an ethylene-$\alpha$-olefin copolymer) have a problem in that the olefin resins are non-polar due to their molecular structures, so that it is difficult to print on or coat the surface of a shaped article produced from any of the olefin resins. Further, when a filler is added to the olefin resins, the olefin resins pose problems in that the upper limit of the amount of a filler which can be added to the olefin resins is low, and in that the filler cannot be satisfactorily dispersed in the olefin resins.

Unexamined Japanese Patent Application Laid-Open Specification No. 2002-96426 discloses a laminate formed of a thermoplastic resin composition. Specifically, this patent document proposes a laminate comprising a layer formed of a composition comprising a hydrogenated styrene block copolymer and polypropylene, wherein the hydrogenated styrene block copolymer is a hydrogenation product of a styrene block copolymer comprising a polymer block comprising vinyl aromatic monomers, and a polymer block comprising isoprene and/or butadiene, and having a vinyl bond content (total content of a 3,4-vinyl bond and 1,2-vinyl bond) of 40 mol % or more. The above-mentioned layer of the laminate proposed in this patent document has an excellent balance of properties, such as flexibility, scratch resistance, abrasion resistance, moldability and appearance, but is not satisfactory in that the layer has a hard feeling at low temperatures as compared to the case where a vinyl chloride resin is used, and in that the calendar-moldability and abrasion resistance of the layer are unsatisfactory.

As apparent from the above, the conventional candidates for substitute for a vinyl chloride resins have many problems, and a satisfactory substitute has not yet been developed.

SUMMARY OF THE INVENTION

In this situation, the present inventors have made extensive and intensive studies with a view toward solving the above-mentioned problems of the prior art. As a result, it has unexpectedly been found that the above-mentioned problems can be solved by a specific hydrogenated copolymer-containing laminate and the laminate can be advantageously used as a substitute for a vinyl chloride resin sheet. The specific hydrogenated copolymer-containing laminate comprises a substrate layer comprising a fibrous material, an adhesive layer, and a hydrogenated copolymer composition layer which is laminated on and bonded to the substrate layer through the adhesive layer, the hydrogenated copolymer composition layer comprising a specific amount of a hydrogenated copolymer (I), and a specific amount of a rubbery polymer (II) exclusive of the hydrogenated copolymer (I), wherein the hydrogenated copolymer (I) is obtained by hydrogenating a copolymer comprising conjugated diene monomer units and vinyl aromatic monomer units, a part of the vinyl aromatic monomer units optionally forming at least one vinyl aromatic polymer block, the hydrogenated copolymer (I) having specific characteristics with respect to a vinyl aromatic monomer unit content, a content of the vinyl aromatic polymer block, a weight average molecular weight, and a hydrogenation ratio. Based on this finding, the present invention has been completed.

Accordingly, it is an object of the present invention to provide a hydrogenated copolymer-containing laminate which has excellent properties with respect to calendar-moldability, soft feeling at low temperatures (i.e., low temperature property), anti-blocking property, heat resistance, flexibility, abrasion resistance, scratch resistance, impact resilience and the like, and has feeling extremely similar to a polyvinyl chloride elastomer materials, and hence, can be advantageously used as a substitute for a vinyl chloride resin sheet.

The foregoing and other objects, features and advantages of the present invention will be apparent from the following detailed description taken in connection with the appended claims.

DETAILED DESCRIPTION OF THE INVENTION

According to the present invention, there is provided a hydrogenated copolymer-containing laminate comprising:
a substrate layer comprising a fibrous material,
an adhesive layer, and
a hydrogenated copolymer composition layer which is laminated on and bonded to the substrate layer through the adhesive layer,
the hydrogenated copolymer composition layer comprising:
10 to 90 parts by weight of a hydrogenated copolymer (I), and
90 to 10 parts by weight of a rubbery polymer (II) exclusive of the hydrogenated copolymer (I),
the total of the hydrogenated copolymer (I) and the rubbery polymer (II) being 100 parts by weight,
wherein the hydrogenated copolymer (I) is obtained by hydrogenating a copolymer comprising conjugated diene monomer units and vinyl aromatic monomer units, a part of the vinyl aromatic monomer units optionally forming at least one vinyl aromatic polymer block (A),
the hydrogenated copolymer (I) having the following characteristics (1) to (4):
(1) a vinyl aromatic monomer unit content of from more than 50% by weight to 90% by weight, based on the weight of the hydrogenated copolymer (1),
(2) a content of the vinyl aromatic polymer block (A) of not more than 40% by weight, based on the weight of the hydrogenated copolymer (I),
(3) a weight average molecular weight of from 50,000 to 1,000,000, and
(4) a hydrogenation ratio of 70% or more, as measured with respect to the double bonds in the conjugated diene monomer units.

For easier understanding of the present invention, the essential features and various preferred embodiments of the present invention are enumerated below.

1. A hydrogenated copolymer-containing laminate comprising:
a substrate layer comprising a fibrous material,
an adhesive layer, and
a hydrogenated copolymer composition layer which is laminated on and bonded to the substrate layer through the adhesive layer,
the hydrogenated copolymer composition layer comprising:
10 to 90 parts by weight of a hydrogenated copolymer (I), and
90 to 10 parts by weight of a rubbery polymer (II) exclusive of the hydrogenated copolymer (I),
the total of the hydrogenated copolymer (I) and the rubbery polymer (II) being 100 parts by weight,
wherein the hydrogenated copolymer (I) is obtained by hydrogenating a copolymer comprising conjugated diene monomer units and vinyl aromatic monomer units, a part of the vinyl aromatic monomer units optionally forming at least one vinyl aromatic polymer block (A),
the hydrogenated copolymer (I) having the following characteristics (1) to (4):
(1) a vinyl aromatic monomer unit content of from more than 50% by weight to 90% by weight, based on the weight of the hydrogenated copolymer (1),
(2) a content of the vinyl aromatic polymer block (A) of not more than 40% by weight, based on the weight of the hydrogenated copolymer (I),
(3) a weight average molecular weight of from 50,000 to 1,000,000, and
(4) a hydrogenation ratio of 70% or more, as measured with respect to the double bonds in the conjugated diene monomer units.

2. The laminate according to item 1 above, wherein the hydrogenated copolymer (I) has at least one glass transition temperature in the range of from −25° C. to 80° C., and
the rubbery polymer (II) is at least one polymer selected from the group consisting of:
(II-1) an unhydrogenated block copolymer comprising conjugated diene monomer units and vinyl aromatic monomer units, the unhydrogenated block copolymer having at least one glass transition temperature in the range of from −80° C. to lower than −25° C.,
(II-2) a conjugated diene homopolymer having at least one glass transition temperature in the range of from −80° C. to lower than −25° C., or a hydrogenation product thereof,
(II-3) a hydrogenated copolymer obtained by hydrogenating a random or block copolymer comprising conjugated diene monomer units and vinyl aromatic monomer units, the hydrogenated copolymer having a vinyl aromatic monomer unit content of 50% by weight or less, based on the weight of the hydrogenated copolymer, and at least one glass transition temperature in the range of from −80° C. to lower than −25° C.,
(II-4) a block copolymer consisting of at least one vinyl aromatic homopolymer block having a weight average molecular weight of from 2,500 to 40,000, and at least one isoprene homopolymer block having a vinyl bond content of 40% or more, or a hydrogenation product thereof, wherein the at least one vinyl aromatic homopolymer block and the at least one isoprene homopolymer block are arranged in any order,
the block copolymer (II-4) having a vinyl aromatic monomer unit content of 50% by weight or less, based on the weight of the block copolymer (II-4), a weight average molecular weight of from 20,000 to 200,000 and at least one glass transition temperature in the range of from −25° C. to 20° C., and
(II-5) a rubbery olefin polymer having at least one glass transition temperature in the range of from −80° C. to lower than −25° C.,
wherein the glass transition temperature of each of the polymers (I) and (II-1) to (II-5) is a temperature at which a peak of loss tangent (tan δ) is observed in a dynamic viscoelastic spectrum of the polymer.

3. The laminate according to item 1 or 2 above, wherein the hydrogenated copolymer (I) has at least one substituent having at least one functional group selected from the group consisting of a hydroxyl group, an epoxy group, an amino group, a carboxyl group, an acid anhydride group, a silanol group and an alkoxysilane group.

4. The laminate according to any one of items 1 to 3 above, wherein the adhesive layer comprises:

100 parts by weight of a modified conjugated diene polymer (i) having bonded thereto at least one substituent having at least one functional group selected from the group consisting of a hydroxyl group, an epoxy group, an amino group, a carboxyl group, an acid anhydride group, a silanol group and an alkoxysilane group; and at least one reactive substance (ii) selected from the group consisting of:

13 to 95 parts by weight of a composition (ii-1) comprising:
10 to 60 parts by weight of a polyol having 3 or more hydroxyl groups,
3 to 30 parts by weight of a diisocyanate, and
0 to 5 parts by weight of a diol; and
0.1 to 20 parts by weight of a compound (ii-2) having at least 2 functional groups which are reactive to the functional group of the modified conjugated diene polymer (i), with the proviso that, when the functional group of the substituent bonded to the modified conjugated diene polymer (i) is other than an acid anhydride group, the compound (ii-2) has at least 3 functional groups which are reactive to the functional group of the modified conjugated diene polymer (i).

5. The laminate according to item 4 above, wherein the adhesive layer comprises the composition (ii-1) as reactive substance (ii), and is obtained by a method comprising:

(1) mixing 10 to 60 parts by weight of a polyol having 3 or more hydroxyl groups with 100 parts by weight of a modified conjugated diene polymer (i) having bonded thereto at least one substituent having at least one functional group selected from the group consisting of a hydroxyl group, an epoxy group, an amino group, a carboxyl group, an acid anhydride group, a silanol group and an alkoxysilane group, to thereby obtain a mixture;

(2) reacting the mixture obtained in step (1) with 3 to 30 parts by weight of a diisocyanate to obtain a reaction mixture; optionally (3) reacting the reaction mixture obtained in step (2) with up to 5 parts by weight of a diol to obtain a reaction mixture; and (4) applying the reaction mixture obtained in step (2) or (3) to a substrate comprising a fibrous material.

6. The laminate according to any one of items 1 to 5 above, wherein the fibrous material is at least one member selected from the group consisting of a synthetic fiber, a natural fiber, a regenerated fiber and a multicomponent fiber.

7. The laminate according to any one of items 1 to 6 above, wherein at least a part of the hydrogenated copolymer composition layer is foamed.

8. The laminate according to any one of items 1 to 7 above, which is a surface material of a furniture.

9. The laminate according to any one of items 1 to 7 above, which is an interior part of a vehicle.

10. The laminate according to any one of items 1 to 7 above, which is a shoe upper.

11. The laminate according to any one of items 1 to 7 above, which is a part of a bag.

12. The laminate according to any one of items 1 to 7 above, which is a building material.

Hereinbelow, the present invention is described in detail.

The hydrogenated copolymer-containing laminate of the present invention comprises a substrate layer comprising a fibrous material, an adhesive layer, and a hydrogenated copolymer composition layer which is laminated on and bonded to the substrate layer through the adhesive layer.

The hydrogenated copolymer composition layer in the hydrogenated copolymer-containing laminate of the present invention comprises 10 to 90 parts by weight of a hydrogenated copolymer (I), and 90 to 10 parts by weight of a rubbery polymer (II).

In the present invention, the hydrogenated copolymer (I) is obtained by hydrogenating a copolymer comprising conjugated diene monomer units and vinyl aromatic monomer units, a part of the vinyl aromatic monomer units optionally forming at least one vinyl aromatic polymer block (A).

In the present invention, the hydrogenated copolymer (I) has a vinyl aromatic monomer unit content of from more than 50% by weight to 90% by weight, preferably from more than 60 to 88% by weight, more preferably from 62 to 86% by weight, based on the weight of the hydrogenated copolymer (I). In the present invention, for obtaining a laminate having excellent abrasion resistance and scratch resistance, it is necessary that the vinyl aromatic monomer unit content of the hydrogenated copolymer (I) be within the above-mentioned range. When the vinyl aromatic monomer unit content is 50% by weight or less, the abrasion resistance and scratch resistance of the laminate become unsatisfactory. On the other hand, when the vinyl aromatic monomer unit content exceeds 90% by weight, the flexibility of the laminate becomes unsatisfactory. In the present invention, the vinyl aromatic monomer unit content may be measured with respect to a copolymer (hereinafter, frequently referred to as an "unhydrogenated copolymer") prior to the hydrogenation to obtain the hydrogenated copolymer (I).

In the present invention, when the hydrogenated copolymer (I) has the above-mentioned vinyl aromatic polymer block (A), from the viewpoint of the abrasion resistance and scratch resistance of the hydrogenated copolymer-containing laminate, the content of the vinyl aromatic polymer block (A) is not more than 40% by weight, preferably 3 to 40% by weight, more preferably 5 to 35% by weight, based on the weight of the hydrogenated copolymer (I). When the content of the vinyl aromatic polymer block (A) exceeds 40% by weight, the flexibility, abrasion resistance and scratch resistance of the hydrogenated copolymer-containing laminate become unsatisfactory. When it is desired that the hydrogenated copolymer-containing laminate of the present invention exhibit especially excellent anti-blocking property, it is recommended that the block ratio of the vinyl aromatic monomer units (i.e., ratio of the weight of the vinyl aromatic polymer block (A) to the total weight of the vinyl aromatic monomer units present in the copolymer) is 10 to 60% by weight, preferably 13 to 50% by weight, more preferably 15 to 40% by weight.

The content of the vinyl aromatic polymer block (A) in the hydrogenated copolymer (I) can be determined as follows. The weight of the vinyl aromatic polymer block (A) is obtained by, for example, a method in which the unhydrogenated copolymer is subjected to oxidative degradation using tert-butyl hydroperoxide in the presence of osmium tetraoxide as a catalyst (i.e., the method described in I. M. KOLTHOFF, et al., J. Polym. Sci. 1, 429 (1946)). Using the obtained weight of the vinyl aromatic polymer block (A), the content of the vinyl aromatic polymer block (A) in the hydrogenated copolymer (I) is calculated by the below-mentioned formula, with the proviso that, among the polymer chains (formed by the oxidative degradation) corresponding to the vinyl aromatic polymer blocks (A), the polymer chains having a polymerization degree of about 30 or less are not taken into consideration in the measurement of the block ratio.

> Content (% by weight) of the vinyl aromatic polymer block $(A)$={(weight of the vinyl aromatic polymer block $(A)$ in the unhydrogenated copolymer)/(total weight of the vinyl aromatic monomer units in the unhydrogenated copolymer)}×100.

In the present invention, the weight average molecular weight of the hydrogenated copolymer (I) is in the range of from 50,000 to 1,000,000, preferably from 100,000 to 800,000, more preferably from 130,000 to 500,000. When the weight average molecular weight of the hydrogenated copolymer (I) is less than 50,000, the mechanical strength and heat resistance of the hydrogenated copolymer-containing laminate become poor. On the other hand, when the weight average molecular weight of the hydrogenated copolymer (I) exceeds 1,000,000, the molding-processability of the hydrogenated copolymer composition used in the present invention becomes poor. Especially when the improvement of the balance of the mechanical strength and the molding processability is important, it is recommended that the weight average molecular weight of the hydrogenated copolymer (I) is in the range of from more than 100,000 to less than 500,000, preferably from 130,000 to 400,000, more preferably from 150,000 to 300,000. In the present invention, the hydrogenated copolymer (I) has a molecular weight distribution of not more than 10, generally 1.05 to 8, preferably 1.1 to 5, in terms of the Mw/Mn ratio, wherein Mw represents the weight average molecular weight of the hydrogenated copolymer (I) and Mn represents the number average molecular weight of the hydrogenated copolymer (I). When the improvement of the molding-processability of the hydrogenated copolymer composition used in the present invention is important, it is recommended that the molecular weight distribution is in the range of from 1.3 to 5, preferably 1.5 to 5, more preferably 1.6 to 4.5, still more preferably 1.8 to 4.

The hydrogenated copolymer (I) used in the present invention is a hydrogenation product of a copolymer comprising conjugated diene monomer units and vinyl aromatic monomer units. From the viewpoint of the weatherability and heat stability of the hydrogenated copolymer-containing laminate, the hydrogenated copolymer (I) has a hydrogenation ratio of 70% or more, preferably 75% or more, more preferably 80% or more, still more preferably 85% or more, as measured with respect to the double bonds in the conjugated diene monomer units present in the hydrogenated copolymer (I). When the hydrogenated ratio is less than 70%, the weatherability and heat stability of the hydrogenated copolymer-containing laminate become unsatisfactory, thereby leading to a lowering of mechanical strength of the hydrogenated copolymer-containing laminate due to the deterioration during the use of the laminate for a long time or during the molding of the hydrogenated copolymer composition used in the present invention.

In the present invention, there is no particular limitation with respect to the hydrogenation ratio of the double bonds in the vinyl aromatic monomer units present in the hydrogenated copolymer (I). However, it is preferred that the hydrogenation ratio of the double bonds in the vinyl aromatic monomer units is 50% or less, more advantageously 30% or less, still more advantageously 20% or less.

In the present invention, the hydrogenated copolymer (I) preferably has a at least one glass transition temperature within the range of from −25 to 80° C., more preferably −20 to 80° C., still more preferably −10 to 80° C., still more preferably 0 to 70° C., most preferably 5 to 50° C., wherein the glass transition temperature is a temperature at which a peak of loss tangent (tan δ) is observed in a dynamic viscoelastic spectrum of the hydrogenated copolymer (I). In the present invention, the presence of peak(s) of tan δ which is observed within the range of from −25 to 80° C. is attributed to a random copolymer block of a conjugated diene and a vinyl aromatic compound, which polymer block is present in the hydrogenated copolymer (I). From the viewpoint of balance of the abrasion resistance, scratch resistance and flexibility of the hydrogenated copolymer-containing laminate, it is preferred that at least one peak attributed to the random copolymer block is present in the range of from −25 to 80° C.

In the present invention, there is no particular limitation with respect to the structure of the hydrogenated copolymer (I), and the hydrogenated copolymer (I) may have any structure. For example, the hydrogenated copolymer (I) may have a structure represented by a formula selected from the group consisting of the following formulae:

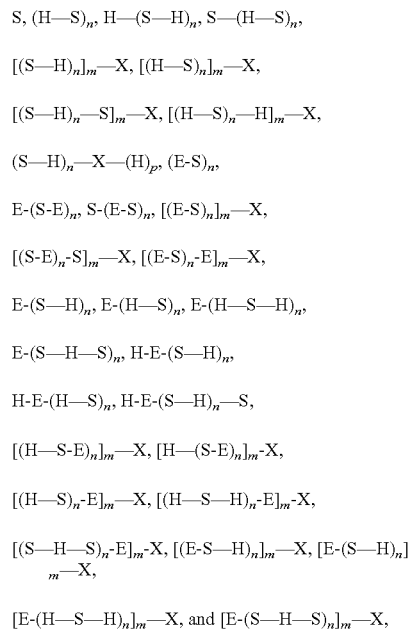

wherein each H independently represents a polymer block of vinyl aromatic monomer units; each S independently represents a random copolymer block comprised of conjugated diene monomer units and vinyl aromatic monomer units; each E independently represents a polymer block of conjugated diene monomer units; each X independently represents a residue of a coupling agent, a residue of a multifunctional initiator or a residue of the below-mentioned modifier; m represents an integer of 2 or more, preferably in the range of from 2 to 10; and each of n and p independently represents an integer of 1 or more, preferably in the range of from 1 to 10.

With respect to each of the hydrogenated copolymer (I)'s represented by the above-mentioned formulae, it is not necessary that a boundary between mutually adjacent polymer blocks be distinct. In the random copolymer S or the random copolymer block S, the vinyl aromatic hydrocarbon monomer units may be uniformly distributed or may be distributed in a tapered configuration. The random copolymer S or the random copolymer block S may have a plurality of segments in which the vinyl aromatic monomer units are uniformly distributed, and/or may have a plurality of segments in which the vinyl aromatic monomer units are distributed in a tapered configuration. Further, the random copolymer S or the random copolymer block S may have a plurality of segments having different vinyl aromatic monomer unit contents. When the hydrogenated copolymer (I) contains a plurality of block H's and/or block S's, the block H's may be the same or different with respect to the structure (e.g., a molecular weight and a composition), and the block S's may also be the same or different with respect to the structure (e.g., a molecular weight and a composition). Further, the polymer chains bonded to the residue X may be the same or different with respect to the structure.

In the present invention, the vinyl aromatic monomer unit content of the hydrogenated copolymer (I) can be measured by using an ultraviolet spectrometer, an infrared spectrophotometer, a nuclear magnetic resonance (NMR) apparatus, or the like. The content of the vinyl aromatic polymer block can be measured by the above-mentioned method of I. M. KOLTHOFF, et al or the like. The vinyl bond content of the conjugated diene monomer units in the unhydrogenated copolymer can be measured by an infrared spectrometer (e.g., by the Hampton method), and the vinyl bond content of the conjugated diene monomer units in the hydrogenated copolymer (I) can be measured by an NMR apparatus. Each of the above-mentioned hydrogenation ratios can also be measured by a method using an infrared spectrophotometer or an NMR apparatus. In the present invention, the weight average molecular weight of the hydrogenated copolymer (I) is a molecular weight at a peak in a chromatogram obtained by analyzing the hydrogenated copolymer (I) by gel permeation chromatography (GPC) using a calibration curve obtained with respect to commercially available standard monodisperse polystyrene samples. The molecular weight distribution (i.e., ratio of Mw (weight average molecular weight) to Mn (number average molecular weight)) can also be measured by GPC.

In the present invention, a conjugated diene used to form conjugated monomer units is a diolefin having a pair of conjugated double bonds. Examples of conjugated dienes include 1,3-butadiene, 2-methyl-1,3-butadiene (isoprene), 2,3-dimethyl-1,3-butadiene, 1,3-pentadiene, 2-methyl-1,3-pentadiene, 1,3-pentadiene, 2-methyl-1,3-pentadiene and 1,3-hexadiene. Of these conjugated dienes, preferred are 1,3-butadiene and isoprene. These conjugated dienes can be used individually or in combination.

Examples of vinyl aromatic compounds used for forming vinyl aromatic monomer units include styrene, α-methylstyrene, p-methylstyrene, divinylbenzene, 1,1-diphenylethylene, N,N-dimethyl-p-aminoethylstyrene and N,N-diethyl-p-aminoethylstyrene. These vinyl aromatic compounds can be used individually or in combination.

In the present invention, the unhydrogenated copolymer can be obtained by, for example, a living anionic polymerization performed in a hydrocarbon solvent in the presence of an initiator, such as an organic alkali metal compound. Examples of hydrocarbon solvents include aliphatic hydrocarbons, such as n-butane, isobutane, n-pentane, n-hexane, n-heptane, and n-octane; alicyclic hydrocarbons, such as cyclohexane, cycloheptane and methylcycloheptane; and aromatic hydrocarbons, such as benzene, toluene, xylene and ethylbenzene.

Examples of initiators include aliphatic hydrocarbon-alkali metal compounds, aromatic hydrocarbon-alkali metal compounds, organic amino-alkali metal compounds, which are generally known to have a living anionic polymerization activity with respect to a conjugated diene and a vinyl aromatic compound. Examples of alkali metals include lithium, sodium and potassium. As preferred examples of organic alkali metal compounds, there can be mentioned lithium compounds having at least one lithium atom in a molecule of a $C_1$-$C_{20}$ aliphatic or aromatic hydrocarbon (such as a monolithium compound, a dilithium compound, a trilithium compound and a tetralithium compound). Specific examples of lithium compounds include n-propyllithium, n-butyllithium, sec-butyllithium, tert-butyllithium, n-pentyllithium, n-hexyllithium, benzyllithium, phenyllithium, tolyllithium, a reaction product of diisopropenyl benzene and sec-butyllithium, and a reaction product obtained by reacting divinyl benzene, sec-butyllithium and a small amount of 1,3-butadiene. Further, it is also possible to use any of the organic alkali metal compounds described in U.S. Pat. No. 5,708,092, GB Patent No. 2,241,239 and U.S. Pat. No. 5,527,753.

In the present invention, when the copolymerization of a conjugated diene monomer and a vinyl aromatic monomer is performed in the presence of the organic alkali metal compound as a polymerization initiator, a tertiary amine compound or an ether compound may be used for controlling the amount of vinyl bonds (i.e., a 1,2-vinyl bond and a 3,4-vinyl bond) formed by the conjugated diene monomers, and for controlling the occurrence of a random copolymerization of a conjugated diene and a vinyl aromatic compound.

In the present invention, the copolymerization of a conjugated diene monomer and a vinyl aromatic hydrocarbon monomer in the presence of the organic alkali metal compound as a polymerization initiator can be conducted either in a batchwise manner or in a continuous manner. Further, the copolymerization may be conducted in a manner wherein a batchwise operation and a continuous operation are used in combination. Especially when it is intended to obtain a copolymer having a relatively broad molecular weight distribution, it is recommended to conduct the copolymerization in a continuous manner. The reaction temperature for the copolymerization is generally in the range of from 0 to 180° C., preferably from 30 to 150° C. The reaction time for the copolymerization varies depending on other conditions, but is generally within 48 hours, preferably in the range of from 0.1 to 10 hours. It is preferred that the atmosphere of the copolymerization reaction system is an atmosphere of an inert gas, such as nitrogen gas. With respect to the polymerization reaction pressure, there is no particular limitation so long as the pressure is sufficient for maintaining each of the monomer(s) and the solvent in a liquid state at a reaction temperature in the above-mentioned range. Further, care must be taken to prevent the intrusion of impurities (such as water, oxygen and carbon dioxide), which deactivate the initiator and/or the living polymer, into the polymerization reaction system.

After completion of the copolymerization reaction, a coupling agent having a functionality of two or more may be added to the copolymerization reaction system to perform a coupling reaction. With respect to the coupling agent having a functionality of two or more, there is no particular limitation, and any of the conventional coupling agents can be used. Examples of coupling agents include carboxylic esters, multivalent epoxy compounds, and halogenated silicon compounds represented by the formula: $R_{4-n}SiX_n$, wherein each R independently represents a $C_1$-$C_{20}$ hydrocarbon group, each X independently represents a halogen atom, and n is an integer of 2 to 4. Further, dimethyl carbonate, diethyl carbonate or the like can be used as a coupling agent.

In the present invention, the hydrogenated copolymer (I) may be a modified, hydrogenated copolymer having a functional group-containing substituent(s) bonded to at least one terminal of the copolymer. Examples of functional group-containing substituents include substituents, each independently having at least one functional group selected from the group consisting of a hydroxyl group, a carboxyl group, a carbonyl group, a thiocarbonyl group, an acid halide group, an acid anhydride group, a carboxylic acid group, a thiocarboxyl group, an aldehyde group, a thioaldehyde group, a carboxylic ester group, an amide group, a sulfonic acid group, a sulfonic ester group, a phosphoric acid group, a phosphoric ester group, an amino group, an imino group, a nitrile group, a pyridyl group, a quinoline group, an epoxy group, a thioepoxy group, a sulfide group, an isocyanate group, an isothiocyanate group, a silicon halide group, a silanol group, an alkoxysilane group, a tin halide group, an alkoxytin group and a phenyltin group. The modified, hydrogenated copolymer used as the hydrogenated copolymer (I) can be produced by a method in which, after the copolymerization reaction to produce the unhydrogenated copolymer, the unhydrogenated copolymer is reacted with a modifier which has the above-mentioned functional group-containing substituent or a modifier which is capable of forming the above-mentioned functional group-containing substituent, followed by hydrogenation. As examples of modifiers having the above-mentioned functional groups, there can be mentioned the modifiers described in Examined Japanese Patent Application Publication No. Hei 4-39495 (corresponding to U.S. Pat. No. 5,115,035) and Unexamined Japanese Patent Application Laid-Open Specification No. 2002-201333.

Specific examples of modifiers include tetraglycidyl-m-xylene-diamine, tetraglycidyl-1,3-bisaminomethylcyclohexane, ε-caprolactone, 4-methoxybenzophenone, γ-glycidoxyethyltrimethoxysilane, γ-glycidoxybutyltrimethoxysilane, γ-glycidoxypropyltriphenoxysilane, bis(γ-glycidoxypropyl)methylpropoxysilane, 1,3-dimethyl-2-imidazolidinone, 1,3-diethyl-2-imidazolidinone, N,N'-dimethylpropyleneurea and N-methylpyrrolidone.

As another example of the method for producing the modified, hydrogenated copolymer, there can be mentioned a method in which a copolymer having no living terminal is reacted with an organic alkali metal compound (such as an organolithium compound) (this reaction is called a "metalation reaction"), thereby obtaining a copolymer having bonded thereto an alkali metal, followed by a reaction of the copolymer with a modifier. In this method, the hydrogenation may be performed either before the above-mentioned metalation reaction or after the modification.

The modifier is generally used in an amount of from 0.3 to 3 equivalents, preferably from 0.5 to 2 equivalents, per equivalent of the initiator used for the copolymerization. When the unhydrogenated copolymer or the hydrogenated copolymer is reacted with a modifier, it is possible that a hydroxyl group, an amino group and the like, which are contained in the modifier, are converted to organic metal salts thereof, depending on the type of modifier. In such case, the organic metal salts can be reconverted to a hydroxyl group, an amino group and the like by reacting the organic metal salts with an active hydrogen-containing compound, such as water or an alcohol.

By hydrogenating the thus-produced unhydrogenated copolymer in the presence of a hydrogenation catalyst, a modified, hydrogenated copolymer (I) can be produced. With respect to the hydrogenation catalyst, there is no particular limitation, and any of the conventional hydrogenation catalysts can be used. Examples of hydrogenation catalysts include:

(1) a carried, heterogeneous hydrogenation catalyst comprising a carrier (such as carbon, silica, alumina or diatomaceous earth) having carried thereon a metal, such as Ni, Pt, Pd or Ru;

(2) the so-called Ziegler type hydrogenation catalyst which uses a transition metal salt (such as an organic acid salt or acetylacetone salt of a metal, such as Ni, Co, Fe or Cr) in combination with a reducing agent, such as an organoaluminum compound; and (3) a homogeneous hydrogenation catalyst, such as the so-called organometal complex, e.g., an organometal compound containing a metal, such as Ti, Ru, Rh or Zr.

Specific examples of hydrogenation catalysts include those which are described in Examined Japanese Patent Application Publication Nos. Sho 42-8704, Sho 43-6636, Sho 63-4841, Hei 1-37970, Hei 1-53851 and Hei 2-9041. As preferred examples of hydrogenation catalysts, there can be mentioned a titanocene compound and a mixture of a titanocene compound and a reductive organometal compound.

Examples of titanocene compounds include those which are described in Unexamined Japanese Patent Application Laid-Open Specification No. Hei 8-109219. Examples of reductive organometal compounds include organic alkali metal compounds, such as an organolithium compound; an organomagnesium compound; an organoaluminum compound; an organoboron compound; and an organozinc compound.

The hydrogenation reaction for producing the hydrogenated copolymer (I) is performed generally at 0 to 200° C., preferably at 30 to 150° C. The hydrogen pressure in the hydrogenation reaction is generally in the range of from 0.1 to 15 MPa, preferably from 0.2 to 10 MPa, more preferably from 0.3 to 5 MPa. The hydrogenation reaction time is generally in the range of from 3 minutes to 10 hours, preferably from 10 minutes to 5 hours. The hydrogenation reaction may be performed either in a batchwise manner or in a continuous manner. Further, the hydrogenation reaction may be performed in a manner wherein a batchwise operation and a continuous operation are used in combination.

By the method described hereinabove, the hydrogenated copolymer is obtained in the form of a solution thereof in a solvent. From the obtained solution, the hydrogenated copolymer is separated. If desired, before the separation of the hydrogenated copolymer, a catalyst residue may be separated from the solution. Examples of methods for separating the hydrogenated copolymer and the solvent to recover the hydrogenated copolymer include a method in which a polar solvent (which is a poor solvent for the hydrogenated copolymer), such as acetone or an alcohol, is added to the solution containing the hydrogenated copolymer, thereby precipitating the hydrogenated copolymer, followed by recovery of the precipitated hydrogenated copolymer; a method in which the solution containing the hydrogenated copolymer is added to hot water while stirring, followed by removal of the solvent by steam stripping to recover the hydrogenated copolymer; and a method in which the solution containing the hydrogenated copolymer is directly heated to distill off the solvent.

The hydrogenated copolymer (I) may have incorporated therein a stabilizer. Examples of stabilizers include phenol type stabilizers, phosphorus type stabilizers, sulfur type stabilizers and amine type stabilizers. The amount of the stabilizer is preferably in the range of from 0.05 to 1.0 part by weight, more preferably 0.1 to 0.5 part by weight, relative to 100 parts by weight of the hydrogenated copolymer (I).

In the present invention, as the modified, hydrogenated copolymer, it is preferred to use a modified, hydrogenated copolymer having at least one substituent containing at least one functional group selected from the group consisting of a hydroxyl group, an epoxy group, an amino group, a carboxyl group, an acid anhydride group, a silanol group and an alkoxysilane group. In the present invention, when it is intended to use a hydrogenated copolymer having at least one substituent containing at least one carboxyl group or at least one acid anhydride group, it is preferred that the modification is stepwise performed using a first-order modifier (used to obtain a first-order modified, hydrogenated copolymer) and a second-order modifier (used to convert the first-order modified, hydrogenated copolymer to a second-order modified, hydrogenated copolymer as the hydrogenated copolymer (I)). Specifically, it is preferred to perform the modification by a method in which a first-order modified, hydrogenated copolymer having at least one substituent containing at least one functional group selected from the group consisting of a hydroxyl group, an epoxy group, an amino group and a silanol group is obtained using a first-order modifier, and the obtained first-order modified, hydrogenated copolymer is reacted with a second-order modifier, such as maleic anhydride, itaconic anhydride, pyromellitic anhydride, cis-4-cyclohexane-1,2-dicarboxylic acid anhydride, 1,2,4,5-benzenetetracarboxylic acid dianhydride, or 5-(2,5-dioxytetrahydroxyfuryl)-3-methyl-3-cyclohexene-1,2-dicarboxylic acid anhydride, to thereby obtain a second-order modified, hydrogenated copolymer as the hydrogenated copolymer (I).

The hydrogenated copolymer (I) used in the present invention can be graft-modified using an $\alpha,\beta$-unsaturated carboxylic acid or a derivative (such as an anhydride, an ester, an amide or an imide) thereof. Specific examples of $\alpha,\beta$-unsaturated carboxylic acids and derivatives thereof include maleic anhydride, maleic anhydride imide, acrylic acid, an acrylic ester, methacrylic acid, a methacrylic ester, and endo-cis-bicyclo(2,2,1)-5-heptene-2,3-dicarboxylic acid and an anhydride thereof. The amount of the $\alpha,\beta$-unsaturated carboxylic acid or derivative thereof is generally in the range of from 0.01 to 20 parts by weight, preferably from 0.1 to 10 parts by weight, relative to 100 parts by weight of the hydrogenated copolymer (I).

When the hydrogenated copolymer is subjected to a graft-modification reaction, the graft-modification reaction is performed preferably at 100 to 300° C., more preferably at 120 to 280° C.

With respect to the details of the method for the graft-modification, reference can be made, for example, to Unexamined Japanese Patent Application Laid-Open Specification No. Sho 62-79211.

Next, an explanation is made with respect to the rubbery polymer (II) used in the present invention.

In the present invention, the rubbery polymer (II) is a polymer which is generally used as a rubber, and is exclusive of the hydrogenated copolymer (I). In the present invention, the use of the rubbery polymer (II) is essential for improving the anti-blocking property and heat resistance of the hydrogenated copolymer-containing laminate.

In the present invention, any rubbery polymers generally used in the art can be used as the rubbery polymer (II). However, it is especially preferred to use at least one polymer selected from the group consisting of:

(II-1) an unhydrogenated block copolymer comprising conjugated diene monomer units and vinyl aromatic monomer units, the unhydrogenated block copolymer having at least one glass transition temperature in the range of from −80° C. to lower than −25° C., (II-2) a conjugated diene homopolymer having at least one glass transition temperature in the range of from −80° C. to lower than −25° C., or a hydrogenation product thereof, (II-3) a hydrogenated copolymer obtained by hydrogenating a random or block copolymer comprising conjugated diene monomer units and vinyl aromatic monomer units, the hydrogenated copolymer having a vinyl aromatic monomer unit content of 50% by weight or less, based on the weight of the hydrogenated copolymer, and at least one glass transition temperature in the range of from −80° C. to lower than −25° C., (II-4) a block copolymer consisting of at least one vinyl aromatic homopolymer block having a weight average molecular weight of from 2,500 to 40,000, and at least one isoprene homopolymer block having a vinyl bond content of 40% or more, or a hydrogenation product thereof, wherein the at least one vinyl aromatic homopolymer block and the at least one isoprene homopolymer block are arranged in any order, the block copolymer (II-4) having a vinyl aromatic monomer unit content of 50% by weight or less, based on the weight of the block copolymer (II-4), a weight average molecular weight of from 20,000 to 200,000 and at least one glass transition temperature in the range of from −25° C. to 20° C., and (II-5) a rubbery olefin polymer having at least one glass transition temperature in the range of from −80° C. to lower than −25° C., wherein the glass transition temperature of each of the polymers (II-1) to (II-5) is a temperature at which a peak of loss tangent (tan $\delta$) is observed in a dynamic viscoelastic spectrum of the polymer.

The reason why the anti-blocking property and heat resistance of the hydrogenated copolymer-containing laminate can be improved by the use of the rubbery polymer (II) has not yet been elucidated, but is considered as follows. For example, in the case of the above-mentioned polymers (II-1), (II-2), (II-3) and (II-5), each of these polymers has a glass transition temperature which is lower than that of the hydrogenated copolymer (I). This fact is considered to be the reason why the above-mentioned effects can be achieved by the use of any of the above-mentioned polymers (II-1), (II-2), (II-3) and (II-5). In the case of the above-mentioned polymer (II-4), this polymer has a glass transition temperature higher than that of the hydrogenated copolymer (I); however, it is considered that the same effects as in the case of the polymers (II-1), (II-2), (II-3) and (II-5) are achieved by the use of the polymer (II-4) due to the structure thereof in which only a vinyl aromatic homopolymer block and an isoprene homopolymer block are present.

In the present invention, the polymer (II-1) is an unhydrogenated block copolymer comprising conjugated diene monomer units and vinyl aromatic monomer units. In a dynamic viscoelastic spectrum of the polymer (II-1), at least one peak of loss tangent (tan $\delta$) is observed within the range of from −80*C to lower than −25° C. The polymer (II-1) has at least one polymer block (preferably at least two polymer blocks) comprised mainly of vinyl aromatic monomer units, and at least one polymer block comprised mainly of conjugated diene monomer units.

The weight average molecular weight of the polymer (II-1) is 30,000 to 1,000,000, preferably 50,000 to 800,000, more preferably 70,000 to 500,000. When the weight average molecular weight of the polymer (II-1) is less than 30,000, the mechanical strength of the hydrogenated copolymer-containing laminate becomes poor. On the other hand, when the weight average molecular weight of the polymer (II-1) exceeds 1,000,000, the melt-kneading of the polymer (II-1) with the hydrogenated copolymer (I) is likely to become unsatisfactory.

From the viewpoint of the flexibility of the hydrogenated copolymer-containing laminate, the vinyl aromatic monomer unit content of the polymer (II-1) is 5 to 70% by weight, preferably 10 to 60% by weight, more preferably 15 to 50% by weight, based on the weight of the polymer (II-1). From the viewpoint of feeling at low temperatures (i.e., low temperature property) of the hydrogenated copolymer-containing laminate of the present invention, it is especially preferred that the polymer (II-1) is a block copolymer which exhibits at least one peak of loss tangent (tan δ) within the range of from −60° C. to −30° C. in a dynamic viscoelastic spectrum of the block copolymer.

In the present invention, there is no particular limitation with respect to the structure of the unhydrogenated block copolymer used as the polymer (II-1), and the unhydrogenated block copolymer may have any structure. For example, the block copolymer may have at least one structure represented by a formula selected from the group consisting of the following formulae:

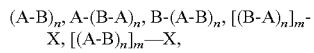
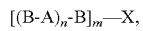
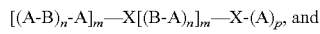

wherein each A independently represents a polymer block composed mainly of vinyl aromatic monomer units; each B independently represents a polymer block composed mainly of conjugated diene monomer units; m is an integer of 2 or more, preferably an integer of from 2 to 10; each of n and p is an integer of 1 or more, preferably an integer of from 1 to 10; and each X independently represents a residue of the above-mentioned coupling agent or a multifunctional initiator, or a residue of the below-described modifier.

In the structures represented by the above formulae, it is not necessary that the boundary between the polymer blocks A and B be distinct. The block copolymer as the polymer (II-1) may be a mixture of different block copolymer represented by the above formulae. When the block copolymer as the polymer (II-1) has a plurality of polymer block A's and/or a plurality of polymer block B's, the polymer block A's may be the same or different with respect to the structure (e.g., a molecular weight and a composition), and the polymer block B's may be the same or different with respect to the structure (e.g., a molecular weight and a composition). Further, the polymer chains bonded to the residue X may be the same or different with respect to the structure. The above-mentioned "polymer block composed mainly of vinyl aromatic monomer units" is a vinyl aromatic homopolymer block or a copolymer block comprising vinyl aromatic monomer units and conjugated diene monomer units, in which the content of the vinyl aromatic monomer units is more than 50% by weight. The above-mentioned "polymer block composed mainly of conjugated diene monomer units" is a conjugated diene homopolymer block or a copolymer block comprising conjugated diene monomer units and vinyl aromatic monomer units, in which the content of the vinyl aromatic monomer units is not more than 50% by weight.

In the present invention, the polymer (II-2) is a conjugated diene homopolymer which exhibits at least one peak of loss tangent (tan δ) within the range of from −80° C. to lower than −25° C. in a dynamic viscoelastic spectrum of the block copolymer, or a hydrogenation product thereof. As conjugated diene homopolymers, there can be mentioned polybutadiene and polyisoprene, but it is preferred to use poly(1,2-butadiene) or a hydrogenation product thereof. From the viewpoint of the mechanical strength of the hydrogenated copolymer-containing laminate and the melt fluidity of the hydrogenated copolymer composition, it is recommended that the polymer (II-2) has a vinyl bond content (i.e., total content of the 1,2-vinyl bond and the 3,4-vinyl bond with the proviso that, when the polymer (II-2) is a butadiene homopolymer, the vinyl bond content means the content of the 1,2-vinyl bond) is 15% or more, preferably 20% or more. When poly(1,2-butadiene) or a hydrogenation product thereof is used as polymer (II-2), the vinyl bond content of the poly(1,2-butadiene) is preferably 70% or more, more preferably 85% or more.

Further, it is recommended that the polymer (II-2) has a crystallinity of 5% or more, preferably 10 to 40%. The molecular weight of polymer (II-2) may be appropriately chosen over a wide range. However, from the viewpoint of the mechanical strength of the hydrogenated copolymer-containing laminate and the melt fluidity of the hydrogenated copolymer composition, it is recommended that polymer (II-2) has a molecular weight such that the intrinsic viscosity of polymer (II-2) as measured at 30° C. in toluene is 0.5 dl/g or more, preferably 1.0 to 3.0 dl/g.

When a hydrogenation product of a conjugated diene homopolymer is used as polymer (II-2), the hydrogenation product may be a hydrogenated conjugated diene homopolymer which has a linear or branched structure, and has a plurality of segments having different vinyl aromatic monomer unit contents. In the present invention, a hydrogenated product of a copolymer comprising conjugated diene monomer units and vinyl aromatic monomer units, which has a vinyl aromatic monomer unit content of less than 5% by weight, is regarded as a hydrogenated conjugated diene homopolymer.

In the present invention, polymer (II-3) is a hydrogenated copolymer which is obtained by hydrogenating a random or block copolymer comprising conjugated diene monomer units and vinyl aromatic monomer units, and which exhibits at least one peak of loss tangent (tan δ) within the range of from −80° C. to lower than −25° C. in a dynamic viscoelastic spectrum of the copolymer. The above-mentioned hydrogenated copolymer used as polymer (II-3) has a vinyl aromatic monomer unit content of 50% by weight or less, preferably 50 to 5% by weight, more preferably 45 to 10% by weight, based on the weight of the hydrogenated copolymer. It is preferred that the hydrogenated copolymer used as polymer (II-3) has a hydrogenation ratio of 70% or more, more advantageously 75% or more, still more advantageously 80% or more, still more advantageously 85% or more, as measured with respect to the double bonds in the conjugated diene monomer units present in the hydrogenated copolymer.

In the present invention, when a hydrogenated block copolymer (II-3) is used as rubbery polymer (II), it is preferred that the hydrogenated block copolymer (II-3) comprises at least one (preferably, two or more) polymer block comprised mainly of vinyl aromatic monomer units, and at least one polymer block comprised mainly of conjugated diene monomer units. With respect to the structure of the hydrogenated block copolymer (II-3), there is no particular limitation, and the block copolymer may have any structure. For example, the hydrogenated block copolymer (II-3) may be a hydrogenation product of a block copolymer having at least one structure represented by a formula selected from the group consisting of the formulae mentioned above in connection with the polymer (II-1). The hydrogenated block copolymer (II-3) may be a mixture of hydrogenated block copolymers having different structures represented by the above-mentioned formulae.

In the present invention, polymer (II-4) is a block copolymer consisting of at least one vinyl aromatic homopolymer block having a weight average molecular weight of from 2,500 to 40,000, and at least one isoprene homopolymer block having a vinyl bond content of 40% or more, or a hydrogenation product thereof. The block copolymer or the hydrogenation product thereof as polymer (II-4) has a vinyl aromatic monomer unit content of 50% by weight or less, based on the weight of the block copolymer (II-4), a weight average molecular weight of from 20,000 to 200,000 and at least one glass transition temperature in the range of from −25° C. to 20° C.

In polymer (II-4), the weight average molecular weight of the vinyl aromatic homopolymer block is 2,500 to 40,000, preferably 2,500 to 20,000. When the weight average molecular weight of the vinyl aromatic homopolymer block exceeds 40,000, the melt fluidity of the hydrogenated copolymer composition used in the present invention becomes poor, thereby lowering the moldability of the hydrogenated copolymer composition at the time of formation of the hydrogenated copolymer layer. On the other hand, when the weight average molecular weight of the vinyl aromatic homopolymer block is lower than 2,500, the heat resistance of the hydrogenated copolymer-containing laminate becomes poor.

The weight average molecular weight of polymer (II-4) is 20,000 to 200,000, preferably 30,000 to 100,000. When the weight average molecular weight of polymer (II-4) exceeds 200,000, the melt fluidity of the hydrogenated copolymer composition used in the present invention becomes poor, thereby lowering the moldability of the hydrogenated copolymer composition at the time of the formation of the hydrogenated composition layer. On the other hand, when the weight average molecular weight of rubbery polymer (II-4) is less than 20,000, the heat resistance, mechanical strength, etc. of the hydrogenated copolymer-containing laminate become unsatisfactory, so that such polymer (II-4) cannot be used as rubbery polymer (II).

As an especially preferred example of the polymer (II-4), there can be mentioned Hybrar® (styrene/isoprene/styrene block copolymer; manufactured and sold by KURARAY CO., LTD., Japan).

In the present invention, polymer (II-5) is a rubbery olefin polymer having at least one glass transition temperature in the range of from −80° C. to lower than −25° C. The rubbery olefin polymer is a polymer having a low crystal density (i.e., low hardness), which generally has a density of less than 0.9, preferably 0.85 or less. Specific examples of rubbery olefin polymers include an ethylene/propylene copolymer, an ethylene/butylene copolymer, an ethylene/hexene copolymer, an ethylene/octene copolymer, an ethylene/propylene/diene copolymer, an ethylene/butene/diene copolymer and a butyl rubber. The weight average molecular weight of the rubbery olefin polymer (II-5) is generally from 30,000 to 1,000,000, preferably 50,000 to 800,000, more preferably 70,000 to 500,000. When the weight average molecular weight of the rubbery olefin polymer (II-5) is less than 30,000, the mechanical strength of the hydrogenated copolymer-containing laminate becomes poor. On the other hand, when the weight average molecular weight of the rubbery olefin polymer (II-5) exceeds 1,000,000, the melt-kneadability between the hydrogenated copolymer (I) and the rubbery polymer (II) becomes poor.

As examples of rubbery polymers (II) other than the above-mentioned polymers (II-1) to (II-5), there can be mentioned an acrylonitrile/butadiene rubber and a hydrogenation product thereof, a chloroprene rubber, an acrylic rubber, a fluorine rubber, a silicone rubber, a chlorinated polyethylene rubber, an epichlorohydrin rubber, an $\alpha,\beta$-unsaturated nitrile/acrylic ester/conjugated diene copolymer rubber, a urethane rubber, a polysulfide rubber and a natural rubber. These rubbery polymers may be modified with a functional group. Further, these rubbery polymers may be used individually or in combination.

The hydrogenated copolymer-containing laminate of the present invention may contain a thermoplastic resin (III) exclusive of the hydrogenated copolymer (I) and the rubbery polymer (II) in the hydrogenated copolymer composition layer. In the present invention, the hydrogenated copolymer (I) and the rubbery polymer (II) are polymers having a hardness of 90 or less, as measured in accordance with JIS K6253, whereas the thermoplastic resin (III) is a polymer having a hardness of more than 90. By the use of thermoplastic resin (III), it becomes possible to control the hardness, melt-fluidity, heat resistance and the like of the hydrogenated copolymer composition or the hydrogenated copolymer composition layer.

It is preferred that the thermoplastic resin (III) is at least one thermoplastic resin selected from the group consisting of an olefin resin and a hydrogenation product of a block copolymer of a vinyl aromatic monomer and a conjugated diene monomer, wherein the hydrogenation product has a vinyl aromatic monomer unit content of more than 50% by weight (hereinafter such a hydrogenation product is frequently referred to as a "hydrogenated block copolymer resin").

Olefin resins usable as the thermoplastic resin (III) are polymers having a density of 0.9 or more and having a high degree of crystallinity (i.e., having a high hardness). Specific examples of such olefin resins include ethylene polymers, such as polyethylene, a copolymer of ethylene with a comonomer copolymerizable with ethylene, which has an ethylene content of 50% by weight or more (e.g., an ethylene/propylene copolymer, an ethylene/propylene/butylene copolymer, an ethylene/butylene copolymer, an ethylene/hexene copolymer, an ethylene/octene copolymer, or an ethylene/vinyl acetate copolymer or a hydrolysis product thereof; a copolymer of ethylene with an acrylic ester (such as methyl acrylate, ethyl acrylate, propyl acrylate, butyl acrylate, pentyl acrylate or hexyl acrylate), wherein the acrylic ester is an ester of acrylic acid with a $C_1$-$C_{24}$ alcohol or glycidyl alcohol; a copolymer of ethylene with a methacrylic ester (such as methyl methacrylate, ethyl methacrylate, propyl methacrylate, butyl methacrylate, pentyl methacrylate or hexyl methacrylate), wherein the methacrylic ester is an ester of methacrylic acid with a $C_1$-$C_{24}$ alcohol or glycidyl alcohol), polyethylene polymers, such as an ethylene/acrylic acid ionomer and a chlorinated polyethylene; propylene polymers, such as polypropylene, a copolymer of propylene with a comonomer copolymerizable with propylene, which has a propylene content of 50% by weight or more (e.g., a propylene/ethylene copolymer, a propylene/ethylene/butylene copolymer, a propylene/butylene copolymer, a propylene/hexene copolymer, a propylene/octene copolymer, a copolymer of propylene with the above-mentioned acrylate monomer, or a copolymer of propylene with the above-mentioned methacrylate monomer) and a chlorinated polypropylene; cyclic olefin type resins, such as an ethylene/norbornene resin; and a polybutene resin. Among these olefin resins, polypropylene, a propylene/ethylene copolymer, a propylene/ethylene/butylene copolymer, a propylene/butylene copolymer, polyethylene, an ethylene/vinyl acetate copolymer, an ethylene/acrylate copolymer and an ethylene methacrylate copolymer are preferred. The copolymer may be either a random copolymer or a block copolymer. These olefin resins may be used individually or in combination. It is preferred that the melt flow rate (measured in accordance with ASTM D1238 at 230° C. under a load of 2.16 KG) of the olefin resin is in the range of from 0.05 to 200 g/10 minutes, more advantageously 0.1 to 150 g/10 minutes. The olefin resin can be obtained by any prior art polymerization method, such as a polymerization using a transition metal catalyst, a radical polymerization or an ionic polymerization. Further, the olefin resin may be a modified olefin resin having a functional group.

In the present invention, the hydrogenated block copolymer resins usable as the thermoplastic resin (III) are hydrogenation products of a block copolymer of a vinyl aromatic monomer and a conjugated diene monomer, which have a vinyl aromatic monomer unit content of more than 50% by weight, preferably in the range of from 60 to 95% by weight, more preferably from 65 to 90% by weight, and which have a hardness of more than 90 as measured in accordance with JIS K6253. In view of the heat deformation resistance of the hydrogenated block copolymer resin, it is recommended that the block ratio of the vinyl aromatic monomer units is more than 60% by weight, preferably 70% by weight or more, more preferably 80% by weight or more. Further, there is no particular limitation with respect to the hydrogenation ratio (as measured with respect to the double bonds in the conjugated diene monomer units of the hydrogenated block copolymer resin) and it may be appropriately selected depending on the use thereof. The hydrogenation ratio may be 70% or more, preferably 80% or more, more preferably 90% or more. Alternatively, only a relatively small amount of the double bonds in the conjugated diene monomer units of the hydrogenated block copolymer resin may be hydrogenated. In this case, it is preferred that the hydrogenation ratio is in the range of from 10% to less than 70%, advantageously from 15% to less than 65%, more advantageously from 20% to less than 60%. Further, it is preferred that peak(s) of tan δ (loss tangent) is not observed within the range of from −20 to 80° C. in a dynamic viscoelastic spectrum of the hydrogenated block copolymer resin.

The weight average molecular weight of the hydrogenated block copolymer resin used as thermoplastic resin (III) is in the range of from 30,000 to 800,000, preferably from 50,000 to 500,000, more preferably from 70,000 to 300,000. When the molecular weight is less than 30,000, the mechanical strength of the hydrogenated copolymer-containing laminate becomes poor. On the other hand, when the molecular weight is more than 500,000, the melt-kneadability between the thermoplastic resin (III) and the hydrogenated polymer (I) becomes poor.

In the present invention, with respect to the structure of the hydrogenated block copolymer resin used as the thermoplastic resin (III), there is no particular limitation, and the hydrogenated block copolymer may have any structure. For example, there can be used a hydrogenation product of a copolymer having at least one structure represented by a formula selected from the group consisting of the formulae mentioned above in connection with the unhydrogenated block copolymer (II-1) used as the rubbery polymer (II). The hydrogenated block copolymer resin may be a mixture of hydrogenated block copolymers having different structures represented by the above-mentioned formulae.

Specific examples of other resins usable as the thermoplastic resin (III) include a block copolymer of a conjugated diene monomer and a vinyl aromatic monomer; a polymer of the above-mentioned vinyl aromatic monomer; a copolymer of the above-mentioned vinyl aromatic monomer with at least one vinyl monomer (other than the vinyl aromatic monomer), such as ethylene, propylene, butylene, vinyl chloride, vinylidene chloride, vinyl acetate, acrylic acid and an ester thereof (e.g., methyl acrylate), methacrylic acid and an ester thereof (e.g., methyl methacrylate), acrylonitrile and methacrylonitrile; a rubber-modified styrene resin (HIPS); an acrylonitrile/butadiene/styrene copolymer resin (ABS); a methacrylic ester/butadiene/styrene copolymer resin (MBS); a polyacrylate resin; a polymer of acrylonitrile and/or methacrylonitrile; a nitrile resin which is a copolymer of an (meth) acrylonitrile with a comonomer copolymerizable with the (meth)acrylonitrile, which has a (meth)acrylonitrile content of 50% by weight or more; polyamide resins, such as nylon-46, nylon-6, nylon-66, nylon-610, nylon-11, nylon-12 and nylon-6/nylon-12 copolymer; a polyester resin; a thermoplastic polyurethane resin; carbonate polymers, such as poly-4, 4'-dioxydiphenyl-2,2'-propane carbonate; thermoplastic polysulfones, such as a polyether sulfone and a polyallylsulfone; a polyoxymethylene resin; polyphenylene ether resins, such as poly(2,6-dimethyl-1,4-phenylene) ether; and polyphenylene sulfide resins, such as polyphenylene sulfide and poly-4,4'-diphenylene sulfide. The number average molecular weight of the above-mentioned thermoplastic resin is generally 1,000 or more, preferably in the range of from 5,000 to 5,000,000, more preferably in the range of from 10,000 to 1,000,000.

In the hydrogenated copolymer-containing laminate of the present invention, it is preferred that the hydrogenated copolymer composition layer is composed of the hydrogenated copolymer (I), the rubbery polymer (II) and the thermoplastic resin (III). The hydrogenated copolymer composition layer contains 10 to 90 parts by weight, preferably 15 to 85 parts by weight, more preferably 20 to 80 parts by weight of the hydrogenated copolymer (I), and 90 to 10 parts by weight, preferably 85 to 15 parts by weight, more preferably 80 to 20 parts by weight of the rubbery polymer (II), wherein the total of the hydrogenated copolymer (I) and the rubbery polymer (II) is 100 parts by weight. When the thermoplastic resin (III) is used in the present invention, the amount of the thermoplastic resin (III) is 5 to 150 parts by weight, preferably 10 to 100 parts by weight, more preferably 10 to 80 parts by weight, relative to 100 parts by weight of the total of the hydrogenated copolymer (I) and the rubbery polymer (II). The amount of each component in the hydrogenated copolymer composition layer is important for obtaining a hydrogenated copolymer-containing laminate having the properties aimed at by the present invention. The hydrogenated copolymer composition layer having the above-mentioned formulation exhibits good roll bank property during calendar molding and, therefore, has excellent calendar-moldability. Herein, the term "roll bank property" is defined as a property of the resin to be banked (accumulated) between the rolls during calendar molding, and excellent roll bank property results in suppression of the variation in the thickness of the obtained sheets.

In the present invention, a filler and/or a flame retardant can be used for improving the hardness and rigidity of the hydrogenated copolymer composition layer or imparting flame retardancy to the hydrogenated copolymer composition layer. With respect to the filler and the flame retardant, there is no particular limitation, and any fillers and flame retardants which are conventionally used in thermoplastic resins or rubbery polymers can be used.

Examples of fillers include silica, calcium carbonate, magnesium carbonate, aluminum hydroxide, carbon black, titanium oxide, alumina, kaolin-clay, silicic acid, calcium silicate, quartz, mica, talc and clay. These compounds may be used individually or in combination.

Examples of flame retardants include a halogen type flame retardant, such as a bromine-containing compound; a phosphorus type flame retardant, such as a phosphorus-containing aromatic compound; and an inorganic flame retardant, such as a metal hydroxide. In recent years, in order to avoid environmental problems, inorganic flame retardants are mainly used as the flame retardant, and the inorganic flame retardant are preferably used also in the present invention.

Examples of inorganic flame retardants include water-containing metal compounds, such as metal hydroxides (e.g., magnesium hydroxide, aluminum hydroxide and calcium hydroxide), metal oxides (e.g., zinc borate and barium borate), calcium carbonate, clay, basic magnesium carbonate and hydrotalcite. Among the above-exemplified inorganic flame retardants, a metal hydroxide, such as magnesium hydroxide, is preferred for effectively improving the flame retardancy of the hydrogenated copolymer composition layer. Further, the above-exemplified flame retardants include the so-called auxiliary flame retardant, which per se has the poor ability to improve flame retardancy, but exhibits a synergistic effect when used in combination with the flame retardant. Each of the filler and the flame retardant may be surface-treated with a surface treating agent, such as a silane coupling agent, before the use thereof.

The amount of the filler and/or the flame retardant is generally in the range of from 0.5 to 300 parts by weight, preferably from 1 to 200 parts by weight, more preferably from 5 to 180 parts by weight, relative to 100 parts by weight of the total of the components (I) and (II) (or when component (III) is used, the total of components (I), (II) and (III)) which constitute the hydrogenated copolymer composition layer. When the amount of the filler and/or the flame retardant exceeds 300 parts by weight, the processability, mechanical strength and the like of the hydrogenated copolymer composition layer becomes poor.

If desired, two or more fillers or flame retardants may be used in combination. There is no particular limitation with respect to the combination of the fillers or the flame retardants, and two or more different fillers may be used in combination, and two or more different flame retardants may be used in combination. Further, the filler and the flame retardant may be used in combination.

In the present invention, for improving the processability during the formation of the hydrogenated copolymer composition layer, a softening agent may be added. As the softening agent, it is suitable to use a mineral oil, or a liquid or low molecular weight synthetic softening agent. It is especially preferred to use a naphthene type and/or paraffin type process oil(s) or extender oil(s), which is/are generally used for softening a rubber, for increasing the volume of a rubber or for improving the processability of a rubber. The mineral oil type softening agent is a mixture of an aromatic compound, a naphthene and a chain paraffin. With respect to the mineral oil type softening agents, a softening agent in which the number of carbon atoms constituting the paraffin chains is 50% or more (based on the total number of carbon atoms present in the softening agent) is generally referred to as a "paraffin type softening agent"; a softening agent in which the number of carbon atoms constituting the naphthene rings is 30 to 45% (based on the total number of carbon atoms present in the softening agent) is generally referred to as a "naphthene type softening agent"; and a softening agent in which the number of carbon atoms constituting the aromatic rings is more than 30% (based on the total number of carbon atoms present in the softening agent) is generally referred to as an "aromatic type softening agent". The hydrogenated copolymer composition may also contain a synthetic softening agent, such as a polybutene, a low molecular weight polybutadiene and a liquid paraffin. The amount of the softening agent used in the hydrogenated copolymer composition layer is generally in the range of from 0 to 100 parts by weight, preferably from 10 to 90 parts by weight, more preferably from 20 to 90 parts by weight, relative to 100 parts by weight of the total of the components (I) and (II) (or relative to 100 parts by weight of the total of components (I), (II) and (III) when component (III) is used) which constitute the hydrogenated copolymer composition layer.

In the present invention, the hydrogenated copolymer composition layer, if desired, may further contain any of the conventional additives other than mentioned above. There is no particular limitation with respect to the type of the additive so long as it is an additive which is generally used in combination with a thermoplastic resin or a rubbery polymer. Examples of additives include a pigment or a coloring agent, a lubricant, a mold release agent, a plasticizer, an antioxidant, a light stabilizer, an ultraviolet absorber, an antistatic agent, and mixtures thereof.

The hydrogenated copolymer composition layer used in the present invention, if desired, may be crosslinked. Examples of methods for the crosslinking include a chemical method which uses a crosslinking agent, such as a peroxide and sulfur, and optionally an auxiliary crosslinking agent, and a method which uses a radiation. The crosslinking may be conducted either in a static manner or in a dynamic manner.

As crosslinking agents, there can be mentioned an organic peroxide, sulfur, a phenol resin type crosslinking agent, an isocyanate resin type crosslinking agent, a thiuram type crosslinking agent and morpholine disulfide. These crosslinking agents can be used together with a crosslinking additive, an auxiliary crosslinking agent or a vulcanization accelerator, such as stearic acid, oleic acid, zinc stearate or zinc oxide. Examples of organic peroxides which can be used as the crosslinking agent include a hydroperoxide, a dialkyl peroxide, a diallyl peroxide, a diacyl peroxide, a peroxy ester and a ketone peroxide. Further, when the above-mentioned organic peroxide is used for crosslinking the hydrogenated copolymer composition, the organic peroxide can be used together with a multifunctional vinyl monomer (such as divinyl benzene or triallyl isocyanurate) or the like. Further, when a sulfur-containing compound is used for crosslinking (vulcanization), if desired, a vulcanization accelerator, such as a sulphenic amide type accelerator, a guanidine type accelerator, a thiuram type accelerator, an aldehyde-amine type accelerator, an aldehyde-ammonia type accelerator, a thiazole type accelerator, a thiourea type accelerator or a dithiocarbamate type accelerator, may be used. The amount of the crosslinking agent used in the hydrogenated copolymer composition layer is generally in the range of from 0.01 to 20 parts by weight, preferably from 0.1 to 15 parts by weight, relative to 100 parts by weight of the total of the components (I) and (II) (relative to 100 parts by weight of the total of components (I), (II) and (II) when component (III) is used) which constitute the hydrogenated copolymer composition layer. In addition, the crosslinking may be performed by a physical method which uses an electron beam or a radiation.

In the hydrogenated copolymer-containing laminate of the present invention, the hydrogenated copolymer composition layer is preferably a sheet or a film, which is composed of the above-mentioned components (I) and (II), and optionally (III). Such a sheet or a film can be produced by conventional methods, such as a method in which the hydrogenated copolymer composition is molded into a sheet or a film by calendar molding, extrusion molding or cast molding; and a method in which a sheet obtained by the above-mentioned method is laminated on another sheet or a cloth. In the present invention, a sheet and a film are distinguished from each other as follows: a sheet is defined as having a thickness of more than 100 μm, preferably in the range of from more than 100 μm to 1 cm, and a film is defined as having a thickness of 100 μm or less, preferably in the range of from 10 to 100 μm.

In the present invention, for improving the appearance, abrasion resistance, weatherability and scratch resistance of the hydrogenated copolymer composition layer, if desired, a decorated film or sheet obtained by applying a decoration, such as printing, coating or grain finishing, to the surface thereof can be used as the hydrogenated copolymer composition layer.

In the present invention, the sheet or the film (which may be decorated) used as the hydrogenated copolymer composition layer inherently exhibits excellent printability and coatability as compared to the case of a resin consisting of an olefin type monomer. It is also possible to perform surface treatment for further improving the printability and coatability of the hydrogenated copolymer composition layer. There is no limitation with respect to the method for the surface treatment, and any of the conventional methods, such as a physical method or a chemical method, can be employed. Examples of surface treatments include a corona discharge treatment, an ozone treatment, a plasma treatment, a flame treatment, and acid/alkali treatment. Among these treatments, a corona discharge treatment is preferred from the viewpoint of ease in practice and cost, and in view of the fact that the corona discharge treatment can be conducted in a continuous manner.

Further, in the present invention, at least a part of the hydrogenated copolymer composition layer may be foamed. Specifically, for example, the above-mentioned sheet or film which is not foamed and the foamed sheet or film can be used in combination as the hydrogenated copolymer composition layer which is partially foamed. Alternatively, the foamed sheet or film can be used alone. When a foamed sheet or film is used as the hydrogenated copolymer composition layer, the foaming for obtaining the foam can be conducted by a chemical method or a physical method. In each of these methods, bubbles are formed throughout the composition by addition of a chemical foaming agent (such as an organic foaming agent or an inorganic foaming agent) or a physical foaming agent. The foam of the hydrogenated copolymer composition can be advantageously used for producing a shaped article having a light weight, an improved flexibility, an improved design, and the like. Examples of inorganic foaming agents include sodium bicarbonate, ammonium carbonate, ammonium bicarbonate, ammonium nitrite, an azide compound, sodium borohydride and a metal powder.

Examples of organic foaming agents include azodicarbonamide, azobisformamide, azobisisobutylonitrile, azobarium dicarbonate, N,N'-dinitrosopentamethylenetetramine, N,N'-dinitroso-N,N'-dimethylterephtalamide, benzene sulfonylhydrazide, p-toluenesulfonyl hydrazide, p,p'-oxybisbenzenesulfonyl hydrazide and p-toluenesulfonyl semicarbazide.

Examples of physical foaming agents include a hydrocarbon, such as pentane, butane or hexane; a halogenated hydrocarbon, such as methyl chloride or methylene chloride; a gas, such as nitrogen gas or air; and a fluoridated hydrocarbon, such as trichlorofluoromethane, dichlorodifluoromethane, trichlorotrifluoroethane, chlorodifluoroethane or a hydrofluoro carbon. The foaming agents mentioned above may be used individually or in any combination. The amount of the foaming agent used for producing the foam is generally in the range of from 0.1 to 8 parts by weight, preferably from 0.3 to 6 parts by weight, more preferably from 0.5 to 5 parts by weight, relative to 100 parts by weight of the total of the components (I) and (II) (or relative to 100 parts by weight of the total of components (I), (II) and (III) when component (III) is used) which constitute the hydrogenated copolymer composition layer.

Next, explanation is made on the adhesive layer of the hydrogenated copolymer-containing laminate of the present invention.

In the present invention, the adhesive layer is necessary for the hydrogenated copolymer composition layer to be laminated on and bonded to the substrate layer.

With respect to the adhesive layer, there is no particular limitation. However, from the viewpoint of improving the adhesion of the hydrogenated copolymer composition layer to the substrate layer, it is preferred that the adhesive layer comprises a modified conjugated diene polymer (i) having bonded thereto at least one substituent having at least one functional group selected from the group consisting of a hydroxyl group, an epoxy group, an amino group, a carboxyl group, an acid anhydride group, a silanol group and an alkoxysilane group; and at least one reactive substance (ii) selected from the group consisting of a composition (ii-1) and a compound (ii-2).

It is preferred that at least one reactive substance (ii) is selected from the group consisting of:

13 to 95 parts by weight, relative to 100 parts by weight of the modified conjugated diene polymer (i), of a composition (ii-1) comprising:

10 to 60 parts by weight of a polyol having 3 or more hydroxyl groups, 3 to 30 parts by weight of a diisocyanate, and 0 to 5 parts by weight of a diol; and 0.1 to 20 parts by weight, relative to 100 parts by weight of the modified conjugated diene polymer (i), of a compound (ii-2) having at least 2 functional groups which are reactive to the functional group of the modified conjugated diene polymer (i), with the proviso that, when the functional group of the substituent bonded to the modified conjugated diene polymer (i) is other than an acid anhydride group, the compound (ii-2) has at least 3 functional groups which are reactive to the functional group of the modified conjugated diene polymer (i).

In the present invention, the above-mentioned modified conjugated diene polymer (i) is a modified polymer having bonded thereto at least one substituent having at least one functional group selected from the group consisting of a hydroxyl group, an epoxy group, an amino group, a carboxyl group, an acid anhydride group, a silanol group and an alkoxysilane group.

As the modified conjugated diene polymer (i), there can be used at least one polymer selected from the group consisting of a modified conjugated diene homopolymer and a modified copolymer comprising conjugated diene monomer units and vinyl aromatic monomer units. The modified conjugated diene polymer (i) may be hydrogenated.

When a modified copolymer comprising conjugated diene monomer units and vinyl aromatic monomer units is used as the modified conjugated diene polymer (i), the vinyl aromatic monomer unit content of the modified copolymer is generally in the range of from 5 to 95% by weight, preferably from 10 to 90% by weight, more preferably from 15 to 85% by weight. For obtaining an adhesive layer having excellent flexibility by using a modified copolymer having a vinyl aromatic monomer unit content in the range of from more than 50% by weight to 95% by weight, preferably from more than 60% by weight to 90% by weight, it is preferred that the ratio (% by weight) of the vinyl aromatic monomer units contained in the polymer block of the vinyl aromatic monomer units, relative to the total weight of vinyl aromatic monomer units contained in the copolymer (hereinafter frequently referred to as the "block ratio of the vinyl aromatic monomer units"), is less than 60% by weight, more advantageously less than 50%, still more advantageously 40% or less. When the vinyl aromatic monomer unit content of the modified copolymer is 5 to 50% by weight, preferably 10 to 45% by weight, there is no particular limitation with respect to the block ratio of the vinyl aromatic monomer units. However, it is preferred that the block ratio of the vinyl aromatic monomer units is less than 90% by weight, more advantageously less than 80% by weight, still more advantageously less than 60% by weight. In the present invention, a modified copolymer having a vinyl aromatic monomer unit content of less than 5% by weight is regarded as a modified conjugated diene homopolymer. In the present invention, the vinyl aromatic monomer unit content of the conjugated diene polymer (i) prior to either the modification or the hydrogenation may be used as the vinyl aromatic monomer unit content of the modified conjugated diene polymer (i).

In the present invention, as the modified conjugated diene polymer (i), there can be used a modified polymer or a hydrogenation product thereof, wherein the modified polymer is produced by a process in which a base polymer having a living terminal is produced by a conventional method using an organolithium compound as a polymerization catalyst, and a modifier (described below) is addition-bonded to the living terminal of the base polymer to obtain a modified polymer. The modified polymers prior to hydrogenation (unhydrogenated modified polymers), which are obtained by the above-mentioned method, may have at least one structure represented by a formula selected from the group consisting of the following formulae:

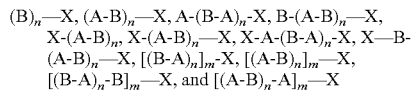

$(B)_n$—X, $(A-B)_n$—X, A-$(B-A)_n$-X, B-$(A-B)_n$—X,
X-$(A-B)_n$, X-$(A-B)_n$—X, X-A-$(B-A)_n$-X, X—B-
$(A-B)_n$—X, $[(B-A)_n]_m$-X, $[(A-B)_n]_m$—X,
$[(B-A)_n$-B$]_m$—X, and $[(A-B)_n$-A$]_m$—X wherein each A independently represents a polymer block of vinyl aromatic monomer units, and each B independently represents either a homopolymer of conjugated diene monomer units or a copolymer comprised of conjugated diene monomer units and vinyl aromatic monomer units, or a homopolymer block of conjugated diene monomer units or a copolymer block comprised of conjugated diene monomer units and vinyl aromatic monomer units; n represents an integer of 1 or more, preferably in the range of from 1 to 5, and m represents an integer of 2 or more, preferably in the range of from 2 to 11; and each X independently represents a modifier group in which an atom group having a functional group (described below) is bonded thereto.

In copolymer or copolymer block B comprised of conjugated diene monomer units and vinyl aromatic monomer units, the vinyl aromatic monomer units may be uniformly distributed or may be distributed in a tapered configuration. The copolymer or copolymer block B may have a plurality of segments in which the vinyl aromatic monomer units are uniformly distributed and/or may have a plurality of segments in which the vinyl aromatic monomer units are distributed in a tapered configuration. When X is addition-bonded to the conjugated diene polymer by a metalation reaction (described below), X is bonded to a side chain of polymer block A and/or polymer block B. Further, the structures of the polymer chains each having X bonded thereto may be the same or different.

In the present invention, the modified polymer as the modified conjugated diene polymer (i) may be a mixture of different modified polymers represented by the above formulae.

In the present invention, the total content of the 1,2-vinyl bond and 3,4-vinyl bond (or the content of the 1,2-vinyl bond in the case where polybutadiene is used as the modified conjugated diene monomer (i)) is defined as the 1,2-vinyl bond content of the conjugated diene polymer portion of the modified conjugated diene polymer (i), and the 1,2-vinyl bond content of the conjugated diene portion of the modified conjugated diene polymer (i) can be appropriately controlled by using the below-described polar compound and the like. The 1,2-vinyl bond content of the modified conjugated diene polymer (i) is preferably in the range of from 5 to 90%, more preferably from 10 to 80%.

As explained above, in the present invention, the modified conjugated diene polymer (i) is a modified polymer having bonded thereto at least one substituent having at least one functional group selected from the group consisting of a hydroxyl group, an epoxy group, an amino group, a carboxyl group, an acid anhydride group, a silanol group and an alkoxysilane group.

As a method for obtaining a modified polymer having the above-mentioned functional group bonded thereto, there can be mentioned a method in which the functional group-containing modifier is addition-bonded to the living terminal of the base polymer, wherein the modifier contains a functional group which is capable of forming a modified polymer having bonded thereto at least one substituent having at least one of the above-mentioned functional groups. Alternatively, the modified polymer having the functional group can be obtained by addition-bonding a modifier containing a substituent having a functional group which is protected by a conventional method.

As another method for producing the modified polymer, there can be mentioned a method in which an organic alkali metal compound, such as an organolithium compound, is addition-bonded to a base polymer which does not have a living terminal (this addition reaction is called metalation reaction), followed by the addition-bonding of a modifier to the base polymer. In this method, the base polymer may be hydrogenated before the metalation reaction and the subsequent addition-bonding of the modifier.

In the present invention, the modifiers which are the same as those used for producing a modified hydrogenated copolymer usable as the above-mentioned hydrogenated copolymer (I) can be used for producing the modified conjugated diene polymer (i). In addition, the same modification methods as used for producing the modified hydrogenated copolymer can be employed for producing the modified conjugated diene polymer (i).

The above-mentioned hydrogenation product of the modified conjugated diene polymer (i) is obtained by the hydrogenation of the modified polymer obtained by the above-mentioned method. The hydrogenation can be performed in the same manner as in the hydrogenation of the modified hydrogenated copolymer usable as the above-mentioned hydrogenated copolymer (I).

When a hydrogenation product is used as the modified conjugated diene polymer (i), the hydrogenation ratio of the unsaturated double bonds in the conjugated diene monomer units can be appropriately selected depending on the desired properties of the adhesive layer, and there is no particular limitation. With respect to the modified conjugated diene polymer (i), more than 70%, preferably 75% or more, more preferably 85% or more, most preferably 90% or more of the unsaturated double bonds in the conjugated diene monomer units may be hydrogenated. When the hydrogenation ratio exceeds 70%, an adhesive layer having especially high heat deformation resistance and weatherability is obtained. Further, the modified conjugated diene polymer (i) can be partially hydrogenated. In the present invention, the expression "partial hydrogenation" means that the polymer is a mixture of a hydrogenated polymer and an unhydrogenated polymer. When the modified conjugated diene polymer (i) is partially hydrogenated, it is preferred that the hydrogenation ratio is in the range of from 10 to 70%, more advantageously 15 to 65%, still more advantageously 20 to 60%. The partial hydrogenation of the modified conjugated diene polymer (i) enables the obtainment of an adhesive layer having excellent heat deformation resistance while maintaining the properties (such as soft feeling at low temperatures and melt fluidity) of the unhydrogenated polymer. With respect to the hydrogenation ratio of the aromatic double bonds in the vinyl aromatic monomer units of the modified conjugated diene polymer (i), there is no particular limitation, but it is recommended that the hydrogenation ratio is 50% or less, more advantageously 30% or less, still more advantageously 20% or less.

In the present invention, from the viewpoint of adhesion strength, it is preferred that the weight average molecular weight of the modified conjugated diene polymer (i) is 30,000 or more. Further, from the viewpoint of viscosity and the coating properties of a solution used for forming the adhesive layer, it is preferred that the weight average molecular weight of the modified conjugated diene polymer (i) is 1,500,000 or less, more advantageously in the range of from 40,000 to 1,000,000, still more advantageously from 50,000 to 800,000.

In the present invention, the modified conjugated diene polymer (i) may be graft-modified using an α,β-unsaturated carboxylic acid or a derivative (such as an anhydride, an ester, an amide or an imide) thereof. The amount of the α,β-unsaturated carboxylic acid or a derivative thereof is generally in the range of from 0.01 to 20 parts by weight, preferably from 0.1 to 10 parts by weight, relative to 100 parts by weight of the conjugated diene polymer or a hydrogenation product thereof. The graft modification of the modified conjugated diene polymer (i) can be performed using the graft modifier and the graft modification method which are the same as those used for the graft modification of the hydrogenated copolymer which is usable as the modified hydrogenated copolymer (I).

Further, in the present invention, as the modified conjugated diene polymer (i), there can be used a second-order modified polymer, which is obtained by reacting the above-mentioned graft-modified conjugated diene polymer (as a first-order modified polymer obtained using the above-mentioned modifier as a first-order modifier) with a second-order modifier which is reactive to the grafted functional group of the graft-modified conjugated diene polymer. The second-order modifier is preferably a modifier compound having at least two functional groups selected from the group consisting of a carboxyl group, an acid anhydride group, an isocyanate group, an epoxy group, a silanol group and an alkoxysilane group, with the proviso that, when the functional group bonded to the second-order modifier is an acid anhydride group, the second-order modifier has at least one functional group. When the graft-modified polymer (first-order modified polymer) is reacted with the second-order modifier, it is recommended that the second-order modifier is used in an amount of from 0.3 to 10 moles, preferably from 0.4 to 5 moles, more preferably from 0.5 to 4 moles, relative to one equivalent of the grafted functional group of the graft-modified polymer. There is no particular limitation with respect to the method for reacting the graft-modified polymer with the second-order modifier, and there can be used conventional methods. Examples of conventional methods include a melt-kneading method and a method in which the components of the graft-modified polymer and the second-order modifier are reacted with each other in a state in which they are dissolved or dispersed together in a solvent.

Specific examples of second-order modifiers having a carboxyl group include aliphatic carboxylic acids, such as maleic acid, oxalic acid, succinic acid, adipic acid, azelaic acid, sebacic acid, dodecanedicarboxylic acid, cyclohexanedicarboxylic acid and cyclopentanedicarboxylic acid; and aromatic carboxylic acids, such as terephthalic acid, isophthalic acid, o-phthalic acid, naphthalenedicarboxylic acid, biphenyldicarboxylic acid, trimesic acid, trimellitic acid and pyromellitic acid.

Examples of second-order modifiers having an acid anhydride group include maleic anhydride, itaconic anhydride, pyromellitic anhydride, cis-4-cyclohexane-1,2-dicarboxylic acid anhydride, 1,2,4,5-benzenetetracarboxylic acid dianhydride and 5-(2,5-dioxytetrahydroxyfuryl)-3-methyl-3-cyclohexene-1,2-dicarboxylic acid anhydride.

Examples of second-order modifiers having an isocyanate group include toluoylene diisocyanate, diphenylmethane diisocyanate and multifunctional aromatic isocyanates.

Examples of second-order modifiers having an epoxy group include tetraglycidyl-1,3-bisaminomethylcyclohexane, tetraglycidyl-m-xylenediamine, diglycidylaniline, ethylene glycol diglycidyl, propylene glycol diglycidyl and terephthalic acid diglycidyl ester acrylate. In addition, there can be mentioned the epoxy compounds which are exemplified above as the modifier used for obtaining the modified conjugated diene polymer (i).

Examples of second-order modifiers having a silanol group include hydrolysis products of alkoxysilane compounds which are exemplified above as the modifier used for obtaining the modified conjugated diene polymer (i).

Examples of second-order modifiers having an alkoxysilane group include bis-(3-triethoxysilylpropyl)-tetrasulfane, bis-(3-triethoxysilylpropyl)-disulfane, ethoxysiloxane oligomers, and silane compounds which are exemplified above as the modifier used for obtaining the modified conjugated diene polymer (i).

Next, explanation is made on the above-mentioned reactive substance (ii).

In the present invention, a reactive substance (ii) is at least one member selected from the group consisting of a composition (ii-1) and a compound (ii-2). Hereinbelow, the composition (ii-1) is explained.

In the present invention, the composition (ii-1) is a composition comprising 10 to 60 parts by weight of a polyol having 3 or more hydroxyl groups, 3 to 30 parts by weight of a diisocyanate, and 0 to 5 parts by weight of a diol.

As examples of the polyols having 3 or more hydroxyl groups which are contained in the composition (ii-1), there can be mentioned a polyether polyol, a polyester polyol, a polycarbonate polyol, a polybutylene polyol, a polybutadiene polyol, a polyisoprene polyol, a hydrogenated polybutadiene polyol, a hydrogenated polyisoprene polyol, a polyacrylate polyol, and castor oil and a derivative thereof. The above-mentioned polyether polyols include homopolymers (such as polyoxypropylene polyol and polyoxyethylene polyol) and random or block copolymers (such as polyoxyethylene/propylene polyol) obtained by a ring-opening polymerization of propylene oxide and/or ethylene oxide in the presence of at least one low molecular weight active hydrogen-containing compound having two or more active hydrogen atoms; bisphenol A and/or bisphenol F having addition bonded thereto propylene oxide and/or ethylene oxide; and polyoxytetramethylene glycol obtained by the ring-opening polymerization of tetrahydrofuran.

Examples of the low molecular weight active hydrogen-containing compounds include diols, such as ethylene glycol, propylene glycol, tetramethylene glycol, 1,4-butanediol, 1,5-pentanediol, 1,6-hexanediol, and neopentyl glycol; triols, such as glycerin, trimethyrolpropane, and 1,2,6-hexanetriol; and amines, such as ammonia, methylamine, ethylamine, propylamine and butylamine.

In general, the polyester polyols mentioned above are produced by reacting a polybasic acid with a polyhydric alcohol or by a ring-opening polymerization of a polyhydric alcohol with ε-caprolactone, β-methyl-δ-valerolactone and the like, and the produced polyester polyols have a hydroxyl group at the terminal(s) thereof. As examples of the polybasic acids, there can be mentioned terephthalic acid, isophthalic acid, phthalic anhydride, succinic acid, adipic acid, azelaic acid, sebacic acid, dodecanoic acid, eicosanoic diacid, dimeric acid, p-oxybenzoic acid, trimellitic anhydride and maleic acid. As examples of the polyhydric alcohols, there can be mentioned the diols and triols exemplified above as the low molecular weight active hydrogen-containing compound, and other polyhydric alcohols, such as diethylene glycol, triethylene glycol, polyethylene glycol, dipropylene glycol, tripropylene glycol, polypropylene glycol, polytetramethylene glycol, 1,4-cyclohexanedimethanol, pentaerythritol, a polybutadiene diol, a hydrogenated polybutadiene diol, 3-methyl-1,5-pentanediol, a propyleneoxide and/or ethyleneoxide adduct of bisphenol A and/or bisphenol F, nonanediol, and methyloctanediol.

Especially preferred polyols are polyether polyols obtained by polymerizing a compound having two hydroxyl groups, namely polytetramethylene glycol and polyoxytetramethylene glycol.

In the present invention, from the viewpoint of the adhesion of the hydrogenated copolymer composition layer to the substrate layer, the molecular weight of the polyol contained in the composition (ii-1) is preferably in the range of from 200 to 10,000, more preferably from 300 to 8,000, most preferably from 500 to 6,000. The polyol is used in an amount of from 10 to 60 parts by weight, preferably from 15 to 50 parts by weight, more preferably from 20 to 40 parts by weight, relative to 100 parts by weight of the modified conjugated diene polymer (i).

Examples of diisocyanates contained in the composition (ii-1) used in the present invention include (hydrogenated) tolylene diisocyanate, (hydrogenated) diphenylmethane diisocyanate and a modified product thereof, hexamethylene diisocyanate, isophorone diisocyanate, 4,4-dicyclohexyl diisocyanate, naphthalene diisocyanate, polymethylenepolyphenyl polyisocyanate, phenylene diisocyanate, (hydrogenated) xylylene diisocyanate, and m-xylylene diisocyanate. Among these diisocyanates, tolylene diisocyanate, diphenylmethane diisocyanate and a modified product thereof, hexamethylene diisocyanate, isophorone diisocyanate and 4,4-dicyclohexyl diisocyanate are preferred, and 4,4-dicyclohexyl diisocyanate is especially preferred.

The diisocyanate is used in an amount of from 3 to 30 parts by weight, preferably from 4 to 24 parts by weight, more preferably from 5 to 18 parts by weight, relative to 100 parts by weight of the modified conjugated diene polymer (i).

In the present invention, it is preferred that the diisocyanate contained in the composition (ii-1) is used in an amount such that the amount of the diisocyanate per mole of the polyol is 1 mole or more, more advantageously more than 1 mole, so as to form a pre-polymer having a terminal isocyanate group. It is recommended that the amount of the diisocyanate per mole of the polyol is in the range of from 1.1 to 3.0 moles, preferably from 1.3 to 2.2 moles.

Examples of diols contained in the composition (ii-1) used in the present invention include 1,4-butanediol, ethylene glycol, diethylene glycol, 1,6-hexanediol, a polybutadiene oligomer having two hydroxyl groups or a hydrogenation product thereof, a polyisoprene oligomer having two hydroxyl groups or a hydrogenation product thereof, a polyethylene oligomer having two hydroxyl groups, a polypropylene oligomer having two hydroxyl groups, a polyethylene oxide oligomer, a polypropylene oxide oligomer, and an oligomeric ethylene oxide/propylene oxide copolymer. Especially preferred diol is 1,4-butanediol.

In the present invention, the molecular weight of the diol contained in the composition (ii-1) is generally in the range of from 40 to less than 10,000, preferably from 50 to less than 5,000, more preferably from 60 to less than 1,000. A mixture of two or more diols can be used in the present invention. The above-mentioned diol is used in an amount of from 0 to 5 parts by weight, preferably from 0.2 to 5 parts by weight, more preferably from 0.4 to 3 parts by weight, most preferably from 0.6 to 2.0 parts by weight, relative to 100 parts by weight of the modified conjugated diene polymer (i).

In the present invention, in addition to the modified conjugated diene polymer (i) and the composition (ii-1), the adhesive layer may contain a compound (ii-2) having at least 2 functional groups which are reactive to the functional group of the modified conjugated diene polymer (i). An adhesive layer having further improved adhesion strength can be obtained by the effect of the compound (ii-2).

Further, in the present invention, an adhesive layer having improved adhesion strength can be obtained by using only the modified conjugated diene polymer (i) and the compound (ii-2) in combination.

It is preferred that the compound (ii-2) is a compound having at least 2 functional groups selected from the group consisting of an isocyanate group, a carboxyl group, an acid anhydride group, a hydroxyl group, an epoxy group, an amino group, a silanol group and an alkoxysilane group (with the proviso that, when the functional group of the substituent bonded to the modified conjugated diene polymer (i) is other than an acid anhydride group, the compound (ii-2) has at least 3 functional groups which are reactive to the functional group of the modified conjugated diene polymer (i)). The compound (ii-2) may be selected by taking into account the type of the functional group of the substituent bonded to the modified conjugated diene polymer (i).

As examples of compounds having at least three isocyanate groups, there can be mentioned a polyisocyanate compound of a polyhydric isocyanate with a trimer of such a polyisocyanate compound, and a urethane prepolymer having terminal isocyanate groups, which is obtained by reacting a polyisocyanate compound and a polyol compound. Specific examples of the compounds having at least three isocyanate groups include tris(p-isocyanatephenyl)thiophosphate, trichloroisocyanuric acid, triarylisocyanurate and triarylcyanurate.

As examples of compounds having at least three carboxyl groups, there can be mentioned trimesic acid, trimellitic acid and pyromellitic acid. As examples of compounds having at least two acid anhydride groups, there can be mentioned pyromellitic anhydride, cis-4-cyclohexane-1,2-dicarboxylic acid anhydride, 1,2,4,5-benzenetetracarboxylic acid dianhydride, and 5-(2,5-dioxytetrahydroxyfuryl)-3-methyl-3-cyclohexene-1,2-dicarboxylic acid anhydride.

As examples of compounds having at least three hydroxyl groups, there can be mentioned pentaerythritol and a condensation product of resorcylic formaldehyde.

As examples of compounds having at least three epoxy groups, there can be mentioned tetraglycidyl-m-xylenediamine, tetraglycidyl-1,3-bisaminomethylcyclohexane, tetraglycidyl-p-phenylenediamine, and tetraglycidyldiaminodiphenylmethane.

As examples of compounds having at least three amino groups, there can be mentioned melamine, triaminopyridine, a triaminophosphoric acid ester, 1,3,6-triaminomethylhexane, and 1,2,4-triaminobenzene.

As examples of compounds having at least three silanol groups or alkoxysilane groups, there can be mentioned vinyltrimethoxysilane, vinyltriethoxysilane, methylmethoxysilane, methylethoxysilane, γ-aminopropyltriethoxysilane, γ-glycidyloxypropyltrimethoxysilane, and γ-methacryloyloxypropyltrimethoxysilane.

Among the above-mentioned compounds, tris(p-isocyanatephenyl)thiophosphate and trichloroisocyanuric acid are especially preferred.

The reactive compound (ii-2) is used in an amount of from 0.1 to 20 parts by weight, preferably from 1 to 10 parts by weight, more preferably from 2 to 8 parts by weight, relative to 100 parts by weight of the modified conjugated diene polymer (i).

In the present invention, as explained below, the adhesive layer is formed by applying a reaction mixture (hereinafter frequently referred to as the "adhesive layer-forming mixture") which is obtained by reacting the above-mentioned component (i) with the component (ii).

In the present invention, a diluent can be used as a solvent for dissolving the adhesive layer-forming mixture or as a medium for suspending/dispersing the adhesive layer-forming mixture. Specific examples of diluents include hydrocarbon solvents, such as an aliphatic hydrocarbon (e.g., butane, pentane, hexane, isopentane, heptane, octane or isooctane), an alicyclic hydrocarbon (e.g., cyclopentane, methylcyclopentane, cyclohexane, methylcyclohexane or ethylcyclohexane), and an aromatic hydrocarbon (e.g., benzene, toluene, ethylbenzene or xylene); straight-chain ether type solvents or cyclic ether type solvents, such as diethylether and tetrahydrofuran; ketone type solvents, such as acetone and methylethylketone; and halogen type solvents, such as chloroform and dichlorodimethylmethane. These solvents may be used individually or in combination. In the present invention, a solvent capable of dissolving the adhesive layer-forming mixture is preferred. The diluent is used in amount of from 100 to 2,000 parts by weight, preferably from 200 to 1,500 parts by weight, more preferably from 300 to 1,000 parts by weight, relative to 100 parts by weight of the modified conjugated diene polymer (i). In the present invention, from the viewpoint of the coating properties of the adhesive layer-forming mixture solution applied onto a substrate, it is recommended that the diluent is used in an amount such that the viscosity of the adhesive layer-forming mixture solution becomes 100 to 10,000 cps, preferably 200 to 5,000 cps, more preferably 300 to 3,000 cps.

Further, during the formation of the adhesive layer, if necessary, a catalyst may be used to promote a reaction of the components of the adhesive layer. Examples of such catalysts include catalysts which are generally used during a urethane reaction (the so-called "tin catalysts", such as dibutyltin dilaurate, dioctyltin dilaurate and tin octylate), amine catalysts (such as triethylamine, N-ethylmorpholine, and triethylenediamine) and titanium catalysts (such as tetrabutyltitanate).

Hereinbelow, explanation is made on the preferred method for forming the adhesive layer of the hydrogenated copolymer-containing laminate of the present invention, which comprises steps (1) to (4) described below.

In step (1), 100 parts by weight of a modified conjugated diene polymer (i) and 10 to 60 parts by weight of a polyol having 3 or more hydroxyl groups are dissolved in a diluent, followed by mixing, to thereby obtain a mixture. The concentration of the modified conjugated diene polymer (i) in the solution of the polyol having 3 or more hydroxyl groups is in the range of from 2 to 35% by weight, preferably from 4 to 30% by weight, more preferably 6 to 25% by weight.

Next, in step (2), 3 to 30 parts by weight of a diisocyanate is added to and reacted with the mixture obtained in step (1) above while stirring, thereby obtaining a reaction mixture. The time necessary for reacting the diisocyanate with the mixture is 0.1 to 5 hours, preferably 0.3 to 4 hours, more preferably 0.5 to 3 hours. The reaction temperature is in the range of from 30° C. to 140° C., preferably from 40° C. to 120° C., more preferably from 60° C. to 100° C.

Optionally, after step (2) above, as step (3), up to 5 parts by weight of a diol may be reacted with the reaction mixture obtained in step (2). In step (3), if necessary, a diluent may be added to the reaction mixture so as to adjust the viscosity of the adhesive layer-forming mixture to fall within the range mentioned above. The temperature for reacting the diol is preferably in the range of from 30° C. to 140° C., advantageously from 40° C. to 120° C., more advantageously from 60° C. to 100° C., and the reaction time is preferably in the range of from 0.1 to 5 hours, more preferably from 0.3 to 4 hours, most preferably from 0.5 to 3 hours.

In the present invention, if necessary, a reactive compound (ii-2) may be added to the reaction mixture obtained in step (2) or (3) above. There is no particular limitation with respect to the conditions for adding the compound (ii-2), but for preventing the viscosity of the adhesive layer-forming mixture from becoming too high during the coating thereof to a substrate, it is preferred that the compound (ii-2) is blended at a temperature of not higher than 50° C., more advantageously not higher than room temperature.

For further improving the adhesion strength of the adhesive layer, the adhesive layer of the hydrogenated copolymer-containing laminate of the present invention may contain a multifunctional vinyl monomer in an amount of from 0.01 to 20 parts by weight, preferably from 0.05 to 15 parts by weight, more preferably from 0.1 to 10 parts by weight, relative to 100 parts by weight of the modified conjugated diene polymer (i). The adhesive layer may also contain an organic peroxide compound in an amount of from 0.01 to 20 parts by weight, preferably from 0.1 to 15 parts by weight, more preferably from 0.5 to 10 parts by weight, relative to 100 parts by weight of the modified conjugated diene polymer (i).

Specific examples of the above-mentioned multifunctional vinyl monomers include divinylbenzene; triarylcyanurate; triarylisocyanurate; multifunctional acrylate monomers, such as butyleneglycol acrylate, diethyleneglycol diacrylate, and a metal acrylate; multifunctional methacrylate monomers, such as butyleneglycol methacrylate, ethyleneglycol dimethacrylate, diethyleneglycol dimethacrylate, polyethyleneglycol dimethacrylate, trimethylolpropane trimethacrylate, aryl methacrylate, and a metal methacrylate; and multifunctional vinyl monomers, such as vinyl butyrate and vinyl stearate.

With respect to the above-mentioned organic peroxides, there is no particular limitation, and conventional organic peroxides may be used. Specific examples of organic peroxides include dicumylperoxide, 2,5-dimethyl-2,5-di-(tert-butylperoxy)hexane, 2,5-dimethyl-2,5-di-(tert-butylperoxy) hexyne-3,1,3-bis-(tert-butylperoxyisopropyl)benzene, 1,1-bis(tert-butylperoxy)-3,3,5-trimethylcyclo-trimethylcyclohexane, n-butyl-4,4-bis(tert-butylperoxy) valerate, and di-tert-butylperoxide.

If necessary, a conventional tackifying resin (such as a rosin type terpene resin, a hydrogenated resin type terpene resin, a coumarone resin, a phenolic resin, a terpene/phenol resin, an aromatic hydrocarbon resin or an aliphatic hydrocarbon resin) and a conventional softening agent (such as a naphthenic process oil, a paraffinic process oil, or a mixture thereof) may be added to the adhesive layer of the hydrogenated copolymer-containing laminate of the present invention. In addition, stabilizers, such as an antioxidant and a light stabilizer, may also be added. Specific examples of additives include those which are described in "Gomu Purasuchikku Haigou Yakuhin (Additives for Rubber and Plastic)" (published by Rubber Digest Co., Ltd., Japan in 2003).

In step (4), the reaction mixture obtained in step (2) or (3) above is applied to a substrate comprising a fibrous material. There is no particular limitation with respect to the method for applying the adhesive layer-forming mixture to the substrate, and there can be mentioned a roll coating method.

Hereinbelow, explanation is made on the substrate layer of the hydrogenated copolymer-containing laminate.

It is preferred that the substrate of the hydrogenated copolymer-containing laminate is a fabric composed of at least one fibrous material selected from the group consisting of a synthetic fiber, a natural fiber, a regenerated fiber and a multi-component fiber.

Specific examples of fabrics include a woven fabric and a nonwoven fabric composed of a single fiber, such as a synthetic fiber (e.g., a polyester fiber, a polyamide fiber, a polyacrylonitrile fiber, a polyolefin fiber or a polyvinyl alcohol fiber), a natural fiber (e.g., a cotton fiber, a silk fiber, a wool fiber or a linen fiber) and a regenerated fiber (e.g., a rayon fiber, a spun rayon fiber or an acetate fiber), a mixed fiber made of two or more of the above-mentioned fibers, and a microfibrillated multi-component fiber which is obtained by dissolving and removing one of the components forming a fiber having a sea-island structure, or by disintegrating a two-component fiber having a rosette structure which is formed by a sheath-core type arrangement or alternating arrangement of the fibers. If desired, use can be made of a woven fabric, a knitted fabric or a non-woven fabric which has been subjected to a napping treatment.

Hereinbelow, explanation is made on the method for producing the hydrogenated copolymer-containing laminate.

With respect to the method for producing the hydrogenated copolymer-containing laminate, there is no particular limitation. The hydrogenated copolymer layer may be prepared by a method in which component (I), component (II) and optionally component (III) are kneaded at 120° C. to 150° C. in a mixing machine, such as a single-screw extruder, a twin-screw extruder, a kneader, a Banbury mixer or a roll, thereby obtaining a composition, and shaping the obtained composition into a sheet or a film by a T-die extruder, a calendar molding machine or the like at a temperature in the range of from 160° C. to 210° C. The adhesive layer may be obtained by preparing the above-mentioned adhesive layer-forming mixture in a liquid form, for example, by dissolving the above-mentioned adhesive layer-forming mixture in an organic solvent (such as toluene or THF) or by preparing an aqueous emulsion of the adhesive layer-forming mixture, and coating the resultant adhesive layer-forming mixture on a substrate layer composed of a fabric, followed by drying. The thus prepared hydrogenated copolymer layer and the substrate layer having the adhesive layer coated thereon are laminated together through the adhesive layer and subjected to heating treatment at 150° C. to 200° C. in a heated air dryer, a heat roll or the like to bond the hydrogenated copolymer layer to the substrate layer through the adhesive layer, thereby obtaining the hydrogenated copolymer-containing laminate.

The thus produced hydrogenated copolymer-containing laminate of the present invention has various excellent properties which are equivalent to or higher than those of a vinyl chloride resin sheet. Specifically, the hydrogenated copolymer-containing laminate of the present invention has excellent properties with respect to flexibility, calendar-moldability, soft feeling at low temperatures (i.e., low temperature property), anti-blocking property, heat resistance, abrasion resistance, scratch resistance, impact resilience and the like. Therefore, the hydrogenated copolymer-containing laminate of the present invention can be advantageously used as a substitute for a vinyl chloride resin sheet, particularly as artificial leathers. Specifically, the hydrogenated copolymer-containing laminate of the present invention can be advantageously used as skins for furniture, such as a chair and a sofa; materials for interior of automobiles, such as a seat, a door, a handle and a trim; shoe uppers of a sports shoes and a casual shoes in which a polyurethane type artificial leather has conventionally been used; materials for bags, such as a skin of a handbag or a business bag and a lining of a sports bag and a back pack; skins for building materials, such as decorations for a wall or a ceiling; and skins for a notebook, a card case and a purse.

BEST MODE FOR CARRYING OUT THE INVENTION

Hereinbelow, the present invention will be described in more detail with reference to the following Examples, Comparative Examples, Reference Examples and Reference Comparative Examples which should not be construed as limiting the scope of the present invention.

In the following Examples, Comparative Examples, Reference Examples and Reference Comparative Examples, various measurements were performed by the following methods.

1. Characteristics and Properties of Copolymers (1) Styrene Content:

The styrene content of the copolymer was determined using an ultraviolet spectrophotometer (trade name: UV-2450; manufactured and sold by Shimadzu Corporation, Japan).

(2) Polystyrene Block Content:

The polystyrene block content of the unhydrogenated copolymer was determined by the method described in I. M. Kolthoff et al., J. Polym. Sci. vol. 1, p. 429 (1946).

(3) Vinyl Bond Content and Hydrogenation Ratio:

The measurement was performed by a nuclear magnetic resonance apparatus (trade name: DPX-400; manufactured and sold by BRUKER, Germany).

(4) Weight Average Molecular Weight and Molecular Weight Distribution:

The weight average molecular weight and number average molecular weight of the unhydrogenated copolymer were measured by gel permeation chromatography (GPC) using a GPC apparatus (manufactured and sold by Waters Corporation, U.S.A.) under conditions wherein tetrahydrofuran was used as a solvent and the measuring temperature was 35° C. In the measurement of the weight average molecular weight and number average molecular weight of the copolymer, there was used a calibration curve obtained with respect to commercially available standard monodisperse polystyrene samples having predetermined molecular weights. The molecular weight distribution is the ratio (Mw/Mn) of the weight average molecular weight (Mw) to the number average molecular weight (Mn).

(5) Modification Ratio

A modified copolymer adsorbs on a silica gel column but not on a polystyrene gel column. Based on such a unique property of the modified copolymer, the modification ratio of the modified copolymer was determined by the following method. A sample solution containing a modified copolymer sample and a low molecular weight internal standard polystyrene is prepared, and the prepared sample solution is subjected to GPC using a standard type polystyrene gel column (trade name: Shodex; manufactured and sold by Showa Denko Co., Ltd., Japan), thereby obtaining a chromatogram. On the other hand, another chromatogram is obtained by subjecting the same sample solution to GPC in substantially the same manner as mentioned above, except that a silica gel column (trade name: Zorbax; manufactured and sold by DuPont de Nemours & Company Inc., U.S.A.) is used in place of the standard type polystyrene gel column. From the difference between the chromatogram obtained using the polystyrene gel column and the chromatogram obtained using the silica gel column, the amount of the copolymer fraction having adsorbed on the silica gel column is determined. From the determined amount of the copolymer fraction, the modification ratio of the modified copolymer is obtained.

(6) Temperature at which a Peak of Loss Tangent (tan δ) is Observed

A dynamic viscoelastic spectrum was obtained by a dynamic viscoelastic spectrum analyzer (type: DVE-V4; manufactured and sold by Rheology Co., Ltd., Japan), wherein the analysis was performed at a frequency of 10 Hz. From the dynamic viscoelastic spectrum, the temperature at which a peak of loss tangent (tan δ) was observed was obtained.

Hydrogenated copolymer (I)'s used in the following Reference Examples and Reference Comparative Examples were obtained as follows.

2. Production of Hydrogenated Copolymer (I)

(1) Preparation of Hydrogenation Catalysts

Hydrogenation catalysts I and II used in the hydrogenation reactions were prepared by the following methods.

(Hydrogenation Catalyst I)

A reaction vessel was purged with nitrogen. Then, to the reaction vessel was fed one liter of dried, purified cyclohexane, followed by addition of 100 mmol of bis($\eta^5$-cyclopentadienyl)titanium dichloride. While vigorously stirring the resultant mixture in the reaction vessel, an n-hexane solution containing 200 mmol of trimethylaluminum was fed to the reaction vessel, thereby effecting a reaction at room temperature for about 3 days to obtain hydrogenation catalyst (I).

(Hydrogenation Catalyst II)

A reaction vessel was purged with nitrogen. Then, to the reaction vessel was fed two liters of dried, purified cyclohexane. Subsequently, 40 mmol of bis-($\eta^5$-cyclopentadienyl)titanium di-(p-tolyl) and 150 g of 1,2-polybutadiene (1,2-vinyl bond content: about 85 mol %) having a molecular weight of about 1,000 were added to and dissolved in the cyclohexane in the reaction vessel. A cyclohexane solution containing 60 mmol of n-butyllithium was charged into the reaction vessel, thereby effecting a reaction at room temperature for five minutes, immediately followed by addition of 40 mmol of n-butanol while stirring. The resultant reaction mixture was stored at room temperature to obtain hydrogenation catalyst (II).

(2) Preparation of Hydrogenated Copolymer (I)

(Hydrogenated Copolymer (I)-1)

An unhydrogenated copolymer was produced by performing a continuous polymerization by the following method in which two reaction vessels (i.e., a first reaction vessel and a second reaction vessel), each of which has an internal volume of 10 liters and is equipped with a stirrer and a jacket, were used.

A cyclohexane solution of butadiene (butadiene concentration: 24% by weight), a cyclohexane solution of styrene (styrene concentration: 24% by weight), and a cyclohexane solution of n-butyllithium (which solution contained 0.077 part by weight of n-butyllithium, relative to 100 parts by weight of the total of the monomers (i.e., the total of the above-mentioned butadiene and the above-mentioned styrene)) were fed to the bottom portion of the first reaction vessel at rates of 4.51 liter/hr, 5.97 liter/hr and 2.0 liter/hr, respectively. A cyclohexane solution of N,N,N',N'-tetramethylethylenediamine was further fed to the bottom portion of the first reaction vessel at a rate wherein the amount of N,N,N',N'-tetramethylethylenediamine in the reaction vessel was 0.44 mole, per mole of the above-mentioned n-butyllithium, to thereby perform a continuous polymerization at 90° C. The reaction temperature was adjusted by controlling a jacket temperature. The temperature around the bottom portion of the first reaction vessel was about 88° C. and the temperature around the top of the first reaction vessel was about 90° C. The average residence time of a polymerization reaction mixture in the first reaction vessel was about 45 minutes. The conversion of butadiene was approximately 100% and the conversion of styrene was 99%.

From the first reaction vessel, a polymer solution was withdrawn, and fed to the bottom portion of the second reaction vessel. Simultaneously with the feeding of the polymer solution, a cyclohexane solution of styrene (styrene concentration: 24% by weight) was fed to the bottom portion of the second reaction vessel at 2.38 liter/hr. In the second reaction vessel, a continuous polymerization was performed at 90° C. to thereby produce a copolymer (unhydrogenated copolymer). The conversion of styrene as measured at the outlet of the second reaction vessel was 98%.

The unhydrogenated copolymer was analyzed by the above-mentioned methods. As a result, it was found that the unhydrogenated copolymer had a styrene content of 67% by weight, a polystyrene block content of 20% by weight, a vinyl bond content (as measured with respect to the butadiene monomer units in the copolymer) of 14% by weight, a weight average molecular weight of 200,000 and a molecular weight distribution of 1.9.

Then, to the obtained unhydrogenated copolymer was added the above-mentioned hydrogenation catalyst I in an amount of 100 ppm by weight, relative to 100 parts by weight of the unhydrogenated copolymer, thereby performing a hydrogenation reaction under conditions wherein the hydrogen pressure was 0.7 MPa and the reaction temperature was 65° C. After completion of the hydrogenation reaction, methanol was added to the second reaction vessel, followed by addition of, as a stabilizer, octadecyl-3-(3,5-di-t-butyl-4- hydroxyphenyl)propionate (0.3 part by weight, relative to 100 parts by weight of the unhydrogenated copolymer), to thereby obtain hydrogenated copolymer (I)-1.

Hydrogenated copolymer (I)-1 had a hydrogenation ratio of 99%. Further, in a dynamic viscoelastic spectrum obtained with respect to hydrogenated copolymer (I)-1, a peak of tan δ was observed at 10° C.

(Hydrogenated Copolymer (I)-2)

An unhydrogenated copolymer (living polymer) was produced by performing a continuous polymerization in substantially the same manner as in the production of hydrogenated copolymer (I)-1.

To the resultant solution of the obtained unhydrogenated polymer was added 1,3-dimethyl-2-imidazolidinone as a modifier, wherein the modifier was used in an equimolar amount, relative to n-butyllithium used in the polymerization, and the unhydrogenated copolymer was reacted with the modifier, thereby obtaining a modified unhydrogenated copolymer.

The above-obtained modified unhydrogenated copolymer was analyzed by the above-mentioned methods. As a result, it was found that the modified copolymer had a styrene content of 67% by weight, a polystyrene block content of 20% by weight, a weight average molecular weight of 200,000, a molecular weight distribution of 1.9 and a modification ratio of about 60%.

Then, to the resultant solution of the obtained modified unhydrogenated copolymer was added the above-mentioned hydrogenation catalyst II in an amount of 200 ppm by weight, in terms of the amount of titanium, based on the weight of the modified unhydrogenated copolymer, thereby performing a hydrogenation reaction under conditions wherein the hydrogen pressure was 0.7 MPa and the reaction temperature was 70° C. After completion of the hydrogenation reaction, as a stabilizer, octadecyl-3-(3,5-di-t-butyl-4-hydroxyphenyl)propionate (0.3 part by weight, relative to 100 parts by weight of the modified copolymer) was added to the reaction vessel, followed by removing the solvent, to thereby obtain a hydrogenated, modified copolymer (hydrogenated copolymer (I)-2).

Hydrogenated copolymer (I)-2 had a hydrogenation ratio of 90%. Further, in a dynamic viscoelastic spectrum obtained with respect to hydrogenated copolymer (I)-2, a peak of tan δ was observed at 10° C.

(Hydrogenated Copolymer (I)-3)

To hydrogenated copolymer (I)-2 was added maleic anhydride in an amount of 2.1 mol per equivalent of the functional group bonded to hydrogenated copolymer (I)-2. The resultant mixture was melt-kneaded by a 30 mmΦ twin-screw extruder under conditions wherein the temperature was 210° C. and the screw revolution rate was 100 rpm, thereby obtaining hydrogenated copolymer (I)-3 having a carboxylic group as a functional group.

(Hydrogenated Copolymer (I)-4)

An unhydrogenated copolymer was produced by performing a continuous polymerization by the following method in which a reaction vessel which has an internal volume of 10 liters and is equipped with a stirrer and a jacket was used.

The reaction vessel was charged with 10 parts by weight of cyclohexane and the internal temperature of the reaction vessel was adjusted to 70° C. To the reaction vessel were added n-butyllithium in an amount of 0.072 part by weight, relative to 100 parts by weight of the total of the monomers (i.e., the total of butadiene and styrene which were used in the production of hydrogenated copolymer (I)-4), and tetramethylethylenediamine (TMEDA) in an amount of 0.8 mol, per mol of the n-butyllithium. Then, a cyclohexane solution containing 10 parts by weight of styrene (styrene concentration: 22% by weight) was fed to the reaction vessel over about 3 minutes, and a polymerization reaction was performed for 30 minutes while maintaining the internal temperature of the reaction vessel at about 70° C.

Subsequently, a cyclohexane solution containing 35 parts by weight of butadiene and 45 parts by weight of styrene (total concentration of butadiene and styrene: 22% by weight) was continuously fed to the reaction vessel at a constant rate over 60 minutes while maintaining the internal temperature of the reaction vessel at about 70° C.

Then, a cyclohexane solution containing 10 parts by weight of styrene (styrene concentration: 22% by weight) was further added to the reaction vessel over about 3 minutes, and a polymerization reaction was performed for 30 minutes while maintaining the internal temperature of the reaction vessel at about 70° C., thereby obtaining an unhydrogenated copolymer. The obtained unhydrogenated copolymer had a styrene content of 65% by weight, a styrene polymer block content of 20% by weight, a vinyl bond content (as measured with respect to the butadiene monomer units in the copolymer) of 20% by weight, a weight average molecular weight of 160,000 and a molecular weight distribution of 1.1.

Then, to the obtained unhydrogenated copolymer was added the above-mentioned hydrogenation catalyst II in an amount of 100 ppm by weight, in terms of the amount of titanium, based on the weight of the unhydrogenated copolymer, and a hydrogenation reaction was performed under conditions wherein the hydrogen pressure was 0.7 MPa and the reaction temperature was 65° C. After completion of the hydrogenation reaction, methanol was added to the reaction vessel, followed by addition of, as a stabilizer, octadecyl-3-(3,5-di-t-butyl-4-hydroxyphenyl)propionate (0.3 part by weight, relative to 100 parts by weight of the unhydrogenated copolymer), to thereby obtain hydrogenated copolymer (I)-4. Hydrogenated copolymer (I)-4 had a hydrogenation ratio of 97%. Further, in a dynamic viscoelastic spectrum obtained with respect to hydrogenated copolymer (I)-4, a peak of tan δ was observed at 1° C.

(Hydrogenated Copolymer (I)-5)

An unhydrogenated copolymer was produced by performing a continuous polymerization by the following method in which two reaction vessels (i.e., a first reaction vessel and a second reaction vessel), each of which has an internal volume of 10 liters and is equipped with a stirrer and a jacket, were used. A cyclohexane solution of butadiene (butadiene concentration: 24% by weight) and a cyclohexane solution of n-butyllithium (which solution contained 0.110 g of n-butyllithium per 100 g of the total of the monomers (i.e., the total of the above-mentioned butadiene and the above-mentioned styrene)) were fed to the bottom portion of the first reaction vessel at rates of 2.06 liter/hr and 1.3 liter/hr, respectively. A cyclohexane solution of TMEDA was further fed to the bottom portion of the first reaction vessel at a rate wherein the amount of TMEDA in the reaction vessel was 0.08 mole, per mole of the above-mentioned n-butyllithium, to thereby perform a continuous polymerization at 70° C. The reaction temperature was adjusted by controlling a jacket temperature. The temperature around the bottom portion of the first reaction vessel was about 69° C. and the temperature around the top of the first reaction vessel was about 70° C. The average residence time of a polymerization reaction mixture in the first reaction vessel was about 145 minutes. The conversion of butadiene was approximately 100%. The obtained polymer was sampled and analyzed. As a result, it was found that the obtained polymer had a vinyl bond content (as measured with respect to the butadiene monomer units in the copolymer) of 16% by weight.

From the first reaction vessel, a polymer solution was withdrawn, and fed to the bottom portion of the second reaction vessel. Simultaneously with the feeding of the polymer solution, a cyclohexane solution of butadiene (butadiene concentration: 24% by weight) and a cyclohexane solution of styrene (styrene concentration: 24% by weight) were fed to the bottom portion of the second reaction vessel at 3.03 liter/hr and 7.68 liter/hr, respectively. A cyclohexane solution of TMEDA was further fed to the bottom portion of the second reaction vessel at a rate wherein the amount of TMEDA in the reaction vessel was 0.30 mole, per mole of the above-mentioned n-butyllithium. In the second reaction vessel, a continuous polymerization was performed at 90° C. to thereby produce an unhydrogenated copolymer. The conversions of butadiene and styrene as measured at the outlet of the second reaction vessel were approximately 100% and 98%, respectively.

The unhydrogenated copolymer was analyzed by the above-mentioned methods. As a result, it was found that the unhydrogenated copolymer had a styrene content of 63% by weight, a polystyrene block content of 0% by weight, a vinyl bond content (as measured with respect to the butadiene monomer units in the copolymer) of 14% by weight (obtained by calculation with respect to the butadiene monomer units in a random copolymer produced in the second reaction vessel), a weight average molecular weight of 170,000 and a molecular weight distribution of 1.8.

Then, to the obtained unhydrogenated copolymer was added the above-mentioned hydrogenation catalyst II in an amount of 100 ppm by weight, in terms of the amount of titanium, based on the weight of the unhydrogenated copolymer, thereby performing a hydrogenation reaction under conditions wherein the hydrogen pressure was 0.7 MPa and the reaction temperature was 65° C. After completion of the hydrogenation reaction, methanol was added to the second reaction vessel, followed by addition of, as a stabilizer, octadecyl-3-(3,5-di-t-butyl-4-hydroxyphenyl)propionate (0.3 part by weight, relative to 100 parts by weight of the unhydrogenated copolymer), to thereby obtain hydrogenated copolymer (I)-5.

Hydrogenated copolymer (I)-5 had a hydrogenation ratio of 98%. Further, in a dynamic viscoelastic spectrum obtained with respect to hydrogenated copolymer (I)-5, a peak of tan δ was observed at 27° C.

In the following Reference Examples and Reference Comparative Examples, hydrogenated copolymer compositions were produced from the above-mentioned hydrogenated copolymers (I)-1 to (I)-5 and the components described below.

3. Rubbery Polymers Used as Component (II)

(Rubbery Polymer-1)

A straight chain styrene/butadiene block copolymer (trade name: Asaprene T420; manufactured and sold by Asahi Kasei Kabushiki Kaisha, Japan) having a styrene content of about 30% by weight. The block copolymer was analyzed by viscoelastometry. As a result, a peak of tan δ was observed at −50° C. in a dynamic viscoelastic spectrum of the block copolymer.

(Rubbery Polymer-2)

A straight chain styrene/butadiene block copolymer (trade name: Asaprene T430; manufactured and sold by Asahi Kasei Kabushiki Kaisha, Japan) having a styrene content of about 30% by weight. The block copolymer was analyzed by viscoelastometry. As a result, a peak of tan δ was observed at −52° C. in a dynamic viscoelastic spectrum of the block copolymer.

(Rubbery Polymer-3)

A branched styrene/butadiene block copolymer containing about 33% by weight of naphthenic process oil (trade name: Asaprene T475; manufactured and sold by Asahi Kasei Kabushiki Kaisha, Japan) having a styrene content of about 40% by weight. The block copolymer was analyzed by viscoelastometry. As a result, a peak of tan δ was observed at −57° C. in a dynamic viscoelastic spectrum of the block copolymer.

(Rubbery Polymer-4)

A straight chain styrene/isoprene block copolymer (trade name: Kraton D1107; manufactured and sold by Kraton Polymers, U.S.A.) having a styrene content of about 15% by weight. The block copolymer was analyzed by viscoelastometry. As a result, a peak of tan δ was observed at −53° C. in a dynamic viscoelastic spectrum of the block copolymer.

(Rubbery Polymer-5)

A straight chain styrene/butadiene block copolymer (SBS) (trade name: KTR-101; manufactured and sold by Kumho Petrochem Co., South Korea) having a styrene content of about 31% by weight. The block copolymer was analyzed by viscoelastometry. As a result, a peak of tan δ was observed at −53° C. in a dynamic viscoelastic spectrum of the block copolymer.

(Rubbery Polymer-6)

A straight chain styrene/butadiene block copolymer (SBS) (trade name: KTR-201; manufactured and sold by Kumho Petrochem Co., South Korea) having a styrene content of about 31% by weight. The block copolymer was analyzed by viscoelastometry. As a result, a peak of tan δ was observed at −52° C. in a dynamic viscoelastic spectrum of the block copolymer.

(Rubbery Polymer-7)

A branched styrene/butadiene block copolymer (SBS) (trade name: KTR-301; manufactured and sold by Kumho Petrochem Co., South Korea) having a styrene content of about 41% by weight. The block copolymer was analyzed by viscoelastometry. As a result, a peak of tan δ was observed at −50° C. in a dynamic viscoelastic spectrum of the block copolymer.

(Rubbery Polymer-8)

A branched styrene/butadiene block copolymer (SBS) containing about 15% by weight of naphthenic process oil (trade name: KTR-601; manufactured and sold by Kumho Petrochem Co., South Korea) having a styrene content of about 40% by weight. The block copolymer was analyzed by viscoelastometry. As a result, a peak of tan δ was observed at −58° C. in a dynamic viscoelastic spectrum of the block copolymer.

(Rubbery Polymer-9)

An SEBS (hydrogenation product of a styrene/butadiene block copolymer) (trade name: TUFTEC H1221; manufactured and sold by Asahi Kasei Kabushiki Kaisha, Japan) having a styrene content of about 13% by weight. The hardness of the SEBS as measured in accordance with JIS K 6253 was 45. The SEBS was analyzed by viscoelastometry. As a result, a peak of tan δ was observed at −28° C. in a dynamic viscoelastic spectrum of the SEBS.

(Rubbery Polymer-10)

An ethylene/propylene/diene monomer copolymer (EPDM) (trade name: Nordel IP3745P; manufactured and sold by Dupont Dow Elastomers L.L.C., U.S.A.). The copolymer was analyzed by viscoelastometry. As a result, a peak of tan δ was observed at −48° C. in a dynamic viscoelastic spectrum of the copolymer.

(Rubbery Polymer-11)

An ethylene/propylene/diene monomer copolymer (EPDM) (trade name: Vistalon 5730; manufactured and sold by Kumho poikchem Co. Ltd., South Korea). The copolymer was analyzed by viscoelastometry. As a result, a peak of tan δ was observed at −45° C. in a dynamic viscoelastic spectrum of the copolymer.

(Rubbery Polymer-12)

An ethylene/propylene copolymer (EPM) (trade name: KEPR 020P; manufactured and sold by Kumho poikchem Co. Ltd., South Korea). The copolymer was analyzed by viscoelastometry. As a result, a peak of tan δ was observed at −52° C. in a dynamic viscoelastic spectrum of the block copolymer.

(Rubbery Polymer-13)

A hydrogenation product of a styrene/isoprene/butadiene triblock copolymer (trade name: HYBRAR 7125; manufactured and sold by Kuraray Co., Ltd., Japan). The triblock copolymer was analyzed by viscoelastometry. As a result, a peak of tan δ was observed at 10° C. in a dynamic viscoelastic spectrum of the triblock copolymer.

4. Thermoplastic Resins Used as Component (III)

(Thermoplastic Resin 1)

A propylene random copolymer (trade name: PC630A; manufactured and sold by SunAllomer Ltd., Japan) having a melt flow rate of 7.5 g/10 min, as measured in accordance with ASTM D1238 (condition L) at 230° C. under a load of 2.16 kg.

(Thermoplastic Resin 2)

An ethylene/vinyl acetate copolymer (trade name: NUC-3461; manufactured and sold by Nippon Unicar Company Limited, Japan).

(Thermoplastic Resin 3)

A propylene random copolymer (trade name: CO-PP R370Y; manufactured and sold by SK Chem. Co., South Korea) having a melt flow rate of 18 g/10 min, as measured in accordance with ASTM D1238 at 230° C. under a load of 2.16 kg.

(Thermoplastic Resin 4)

A SEBS (hydrogenation product of a styrene/butadiene block copolymer) (trade name: TUFTEC H1043; manufactured and sold by Asahi Kasei Kabushiki Kaisha, Japan) having a styrene content of about 67% by weight. The hardness of this block copolymer could not be measured in accordance with JIS K 6253 and, hence, was measured in accordance with ISO 7619 by a durometer type D. As a result, the hardness of the SEBS was found to be 72.

(Thermoplastic Resin 5)

An ethylene/vinyl acetate copolymer (trade name: EVA 1156; manufactured and sold by Hanwha Chemical Corporation, South Korea).

(Thermoplastic Resin 6)

An ethylene/vinyl acetate copolymer (trade name: Elvax 260; manufactured and sold by Dupont, U.S.A.).

In the following Reference Examples and Reference Comparative Examples, characteristics and properties of the obtained hydrogenated copolymer composition layers (sheets) were measured by the following methods.

5. Characteristics of Hydrogenated Copolymer Composition Layers (1) Hardness:

In accordance with JIS K 6253, the hardness of a sheet of the hydrogenated copolymer composition was measured by a durometer (type A) after 10 seconds from the start of the measurement at room temperature (23° C.) and at a low temperature (−10° C.).

(2) Tensile Strength and Elongation at Break:

With respect to a sheet of the hydrogenated copolymer composition, the tensile strength and the elongation at break were measured in accordance with JIS K 6251 (in which a dumbbell No. 3 is used) under conditions wherein the crosshead speed was 500 mm/min. The stress sustained by a sample when the tensile elongation was 100% (i.e., 100% modulus) is used as an index of the flexibility of the hydrogenated copolymer composition.

(3) Impact Resilience:

The Dunlop impact resilience was measured at 23° C. in accordance with the Dunlop impact resilience test prescribed in BS 903.

(4) Surface Touch:

The hydrogenated copolymer composition was subjected to a compression molding, thereby obtaining a sheet having a thickness of 2 mm. The surface touch of the obtained sheet was evaluated by a method in which the obtained sheet and a sheet of a polyvinyl chloride elastomer (trade name: SUMI-FLEX K580CF1; manufactured and sold by Sumitomo Bakelite Co., Ltd., Japan) are touched by hand, and the surface touch of the obtained sheet is compared with that of the sheet of the polyvinyl chloride. The criteria of the evaluation were as follows.

⊚: The surface touch of the sheet of the hydrogenated copolymer composition is as soft as that of the sheet of the polyvinyl chloride elastomer.

○: The surface touch of the sheet of the hydrogenated copolymer composition is slightly harder than that of the sheet of the polyvinyl chloride elastomer.

Δ: The surface touch of the sheet of the hydrogenated copolymer composition is harder than that of the sheet of the polyvinyl chloride elastomer.

x: The surface touch of the sheet of the hydrogenated copolymer composition is much harder than that of the sheet of the polyvinyl chloride elastomer.

(5) Tear Strength:

The tear strength of a sheet of the hydrogenated copolymer composition was measured in accordance with ASTM D2262.

(6) Abrasion Resistance:

Using a Color Fastness Rubbing Tester (trade name: AB-301; manufactured and sold by TESTER SANGYO CO., LTD., Japan), the leather grained surface of a sheet obtained by molding the hydrogenated copolymer was abraded with an abrading cloth (canequim No. 3) under a load of 500 g, and the abrasion resistance was evaluated in terms of a difference between the weight of the sheet prior to the abrasion and the weight of the sheet after the abrasion.

(7) Calendar-Moldability:

The calendar-moldability was evaluated as follows.

With respect to a sheet or a film which had been produced from the hydrogenated copolymer composition, the thickness (t) was measured at 50 points at intervals of 1 m in the machine direction (MD), and the average thickness (T) was calculated. With respect to each of the 50 thickness values (t), the difference thereof from the average thickness (T) (i.e., t−T) was calculated. Based on the obtained 50 (t−T) values, the calendar-moldability was evaluated as follows.

⊚ (very good): All of the 50 (t−T) values fall within the range of ±5% of the average thickness (T).

○ (good): Among all of the 50 (t−T) values, not more than 2 values fall outside the range of ±5% of the average thickness (T).

x (poor): Among all of the 50 (t−T) values, at least 3 values fall outside the range of ±5% of the average thickness (T).

In the following Examples and Comparative Examples, hydrogenated copolymer-containing laminates were produced from hydrogenated copolymer compositions obtained in the above-mentioned Reference Examples and Reference Comparative Examples, and the components described below.

6. Production of Modified Conjugated Diene Polymer (i) for Use in Forming an Adhesive Layer (Modified Conjugated Diene Polymer (i)-1)

55 Parts by weight of butadiene, 45 parts by weight of styrene and 400 parts by weight of cyclohexane were fed to a reaction vessel which has an internal volume of 10 liters and is equipped with a stirrer and a jacket. Further, a cyclohexane solution of N,N,N',N'-tetramethylethylenediamine (TMEDA) was further fed to the reaction vessel in an amount of 0.40 mole, per mole of n-butyllithium to be fed into the reaction vessel. Then, the temperature of the inside of the reaction vessel was elevated to 50° C., followed by addition of n-butyllithium in an amount of 0.08 parts by weight, relative to 100 parts by weight of the total of the monomers (i.e., the total of the above-mentioned butadiene and the above-mentioned styrene), thereby effecting a polymerization reaction.

After the addition of n-butyllithium, the temperature of the inside of the reaction vessel was gradually elevated. When the temperature of the inside of the reaction vessel reached about 100° C., tetraglycidyl-1,3-bisaminomethylcyclohexane (hereinafter, referred to as "modifier M1") was added to the reaction vessel in an amount of 0.25 mole, per mole of n-butyllithium used, thereby obtaining a modified polymer. Then, methanol was added to the obtained modified polymer, followed by addition of, as a stabilizer, octadecyl-3-(3,5-di-t-butyl-4-hydroxyphenyl)propionate (0.3 part by weight, relative to 100 parts by weight of the modified polymer), to thereby obtain modified conjugated diene polymer (i)-1.

Modified conjugated diene polymer (i)-1 had a styrene content of 45% by weight, a polystyrene block content of 18% by weight, a vinyl bond content (as measured with respect to the butadiene monomer units in modified conjugated diene polymer(i)-1) of 35% by weight, a weight average molecular weight of 310,000 and a molecular weight distribution of 1.4. Further, modified conjugated diene polymer (i)-1 had an unmodified block copolymer content of 30% by weight.

(Modified Conjugated Diene Polymer (i)-2)

A cyclohexane solution containing 15 parts by weight of styrene (styrene concentration: 20% by weight) was fed to a reaction vessel which is equipped with a stirrer and a jacket. Further, TMEDA was further fed to the reaction vessel in an amount of 0.1 mole, per mole of n-butyllithium to be fed into the reaction vessel, followed by addition of n-butyllithium in an amount of 0.135 part by weight, relative to 100 parts by weight of the total of the monomers (i.e., the total of butadiene and styrene which were used in the production of modified conjugated diene polymer (i)-2). Then, a polymerization reaction was effected at 70° C. for 1 hour. Further, cyclohexane solution containing 70 parts by weight of butadiene (butadiene concentration: 20% by weight) was fed to the reaction vessel and a polymerization reaction was performed at 70° C. for 1 hour, and then a cyclohexane solution containing 15 parts by weight of styrene (styrene concentration: 20% by weight) was further added, followed by polymerization at 70° C. for 1 hour, thereby obtaining a living polymer.

Subsequently, 1,3-dimethyl-2-imidazolidinone (hereinafter, referred to as "modifier M2") was added to the living polymer obtained above in an equimolar amount, relative to n-butyllithium used, thereby obtaining a modified polymer. Then, methanol was added to the obtained modified polymer, followed by addition of, as a stabilizer, octadecyl-3-(3,5-di-t-butyl-4-hydroxyphenyl)propionate (0.3 part by weight, relative to 100 parts by weight of the modified polymer), to thereby obtain modified conjugated diene polymer (i)-2.

Modified conjugated diene polymer (i)-2 had a styrene content of 30% by weight, a polystyrene block content of 95% by weight, a vinyl bond content of 15% by weight and a weight average molecular weight of 110,000. Further, modified conjugated diene polymer (i)-2 had an unmodified block copolymer content of 25% by weight.

(Modified Conjugated Diene Polymer (i)-3)

A cyclohexane solution containing 15 parts by weight of styrene (styrene concentration: 20% by weight) was fed to a reaction vessel which is equipped with a stirrer and a jacket. Further, TMEDA was fed to the reaction vessel in an amount of 0.3 mole, per mole of n-butyllithium to be fed into the reaction vessel, followed by addition of n-butyllithium in an amount of 0.17 part by weight, relative to 100 parts by weight of the total of the monomers (i.e., the total of butadiene and styrene which were used in the production of modified conjugated diene polymer (i)-3). Then, a polymerization reaction was effected at 70° C. for 1 hour. Further, a cyclohexane solution containing 70 parts by weight of butadiene (butadiene concentration: 20% by weight) was fed to the reaction vessel and a polymerization reaction was performed at 70° C. for 1 hour, and then a cyclohexane solution containing 15 parts by weight of styrene (styrene concentration: 20% by weight) was further added, followed by polymerization at 70° C. for 1 hour.

Subsequently, modifier M2 was added to the living polymer obtained above in an equimolar amount, relative to n-butyllithium used, thereby obtaining a modified polymer, followed by addition of the above-mentioned hydrogenation catalyst I in an amount of 100 ppm by weight, in terms of the amount of titanium, relative to 100 parts by weight of the modified copolymer, thereby performing a hydrogenation reaction under conditions wherein the hydrogen pressure was 0.7 MPa and the reaction temperature was 65° C. to obtain a hydrogenated, modified copolymer. During the hydrogenation reaction, the feeding rate of hydrogen was adjusted so that the hydrogenation ratio became 85%. Then, methanol was added to the obtained hydrogenated, modified copolymer, followed by addition of, as a stabilizer, octadecyl-3-(3, 5-di-t-butyl-4-hydroxyphenyl)propionate (0.3 part by weight, relative to 100 parts by weight of the hydrogenated, modified copolymer), to thereby obtain modified conjugated diene polymer (i)-3.

Modified conjugated diene polymer (i)-3 had a styrene content of 30% by weight, a polystyrene block content of 95% by weight, a vinyl bond content of 35% by weight, a weight average molecular weight of 70,000 and a hydrogenation ratio of 85%. Further, modified conjugated diene polymer (i)-3 had an unmodified block copolymer content of 30% by weight.

(Modified Conjugated Diene Polymer (i)-4)

10 Parts by weight of cyclohexane was fed to a reaction vessel which is equipped with a stirrer and a jacket. Then, the temperature of the inside of the reaction vessel was adjusted to 70° C., followed by addition of n-butyllithium in an amount of 0.25 part by weight, relative to 100 parts by weight of the total of the monomers (i.e., the total of butadiene and styrene which were used in the production of modified conjugated diene polymer (i)-4), and TMEDA in an amount of 0.7 mole, per mole of n-butyllithium. Then, cyclohexane solution containing 22 parts by weight of styrene as a monomer (styrene concentration: 22% by weight) was added to the reaction vessel over about 3 minutes, thereby effecting a polymerization reaction for 30 minutes while maintaining the internal temperature of the reaction vessel at about 70° C.

Subsequently, a cyclohexane solution containing 34 parts by weight of butadiene and 44 parts by weight of styrene (total concentration of butadiene and styrene: 22% by weight) was continuously fed to the reaction vessel at a constant feeding rate over 60 minutes while maintaining the temperature of the inside of the reaction vessel at about 70° C.

Then, modifier M1 was added to the reaction vessel in an amount of ¼ mole, per mole of n-butyllithium used, thereby obtaining a modified polymer. The obtained modified polymer had a styrene content of 66% by weight, a polystyrene block content of 22% by weight, and a vinyl bond content of 30% by weight.

Then, the obtained modified polymer was subjected to a hydrogenation reaction in substantially the same manner as in the production of modified conjugated diene polymer (i)-3, except that hydrogenation catalyst II was used, thereby obtaining modified conjugated diene polymer (i)-4.

Modified conjugated diene polymer (i)-4 had a weight average molecular weight of 180,000, a molecular weight distribution of 1.3 and a hydrogenation ratio of 98%. Further, modified conjugated diene polymer (i)-4 had an unmodified block copolymer content of 25% by weight. Further, in a dynamic viscoelastic spectrum obtained with respect to modified conjugated diene polymer (i)-4, a peak of tan δ was observed at 2° C.

(Unmodified conjugated diene polymer (i)-5)

Unmodified conjugated diene polymer (i)-5 was produced in substantially the same manner as in the production of modified conjugated diene polymer (i)-2, except that a modification reaction using modifier M2 was not performed.

(Modified Conjugated Diene Polymer (i)-6)

Maleic anhydride was added to a solution of the same polymer as modified conjugated diene polymer (i)-2 except that a stabilizer had not been added, wherein the maleic anhydride was used in an amount of 2 mole, per mole of n-butyllithium used, and a modification reaction was effected, thereby obtaining a second-order modified polymer (modified conjugated diene polymer (i)-6) having carboxyl group-containing terminals.

7. Fillers Used (Filler 1)

Magnesium hydroxide (trade name: KISUMA 5A; manufactured and sold by KYOWA CHEMICAL INDUSTRY Co., Ltd., Japan)

(Filler 2)

Aluminum hydroxide (manufactured and sold by Jung Woo International, South Korea)

8. Foaming Agent

Azodicarbonamide (trade name: AC 1000; manufactured and sold by Kumyang Chemical Co., Ltd., South Korea)

9. Auxiliary Foaming Agent (Kicker)

Zinc oxide (manufactured and sold by Kumyang Chemical Co., Ltd., South Korea)

10. Lubricant

Zinc stearate (manufactured and sold by Hea Dock Chemical, South Korea)

11. Substrate Cloth Used (Substrate Cloth 1)

PET nonwoven fabric (manufactured and sold by Hankuk company, South Korea)

(Substrate Cloth 2)

Nylon woven fabric (manufactured and sold by Jung-jun company, South Korea)

(Substrate Cloth 3)

PET woven fabric (manufactured and sold by Gumsung Textile, South Korea)

Characteristics and properties of hydrogenated copolymer-containing laminates obtained in the following Reference Examples and Reference Comparative Examples were measured by the following methods.

12. Characteristics of Hydrogenated Copolymer-Containing Laminates (1) Evaluation of Adhesiveness:

An adhesive composition was uniformly applied to a substrate cloth by using a roll bar, so as to form an adhesive layer having a thickness of 0.1 mm. Then, a solvent is volatilized from the adhesive layer using an oven at 80° C. over 10 minutes. A sheet or a film was laminated on the substrate cloth through the adhesive layer, and the resultant laminate was pressed at 150° C. under a load of 50 kg, thereby obtaining a test sample.

The adhesion strength of the adhesive composition was measured by the T-type peel strength test (JIS K 6854-3), and used as a yardstick for the adhesiveness of the adhesive composition (the greater the adhesion strength, the better the adhesiveness). The T-type peel strength test was performed under the following conditions.

(The peel strength test) pulling rate: 200 mm/min (2) Feeling of Laminate at Low Temperatures:

The laminate was held tightly by hand at −10° C., and the feeling of the laminate was evaluated in accordance with the following criteria.

○: The feeling of the laminate is as soft as that of an artificial leather made of a polyvinyl chloride.

Δ: The feeling of the laminate is slightly harder than that of an artificial leather made of a polyvinyl chloride.

x: The feeling of the laminate is much harder than that of an artificial leather made of a polyvinyl chloride.

REFERENCE EXAMPLES 1 TO 4

In each of Reference Examples 1 to 4, a hydrogenated copolymer composition was produced as follows. The components indicated in Table 1 were kneaded and extruded by a twin-screw extruder (trade name: PCM30; manufactured and sold by Ikegai Corporation, Japan) under conditions wherein the cylinder temperature was 210° C. and the screw revolution rate was 300 rpm, thereby obtaining a hydrogenated copolymer composition in the form of pellets. As a lubricant, zinc stearate was added to the hydrogenated copolymer composition in an amount of 1 part by weight, relative to 100 parts by weight of the total of components (I) to (III).

In each of Reference Examples 1 to 4, the obtained hydrogenated copolymer composition in the form of pellets was subjected to compression molding to produce a sheet (test specimen) having a thickness of 2 mm, and the properties of the test specimen were measured by the above-mentioned methods. The results are shown in Table 2.

Further, the same compositions as those of Reference Examples 1 to 3 except that component (I) was not used were produced, and the abrasion resistance of each of the obtained compositions was evaluated by the above-mentioned method.

As a result, it was found that the obtained compositions (containing no component (I)) exhibited a poor abrasion resistance, as compared to that of the hydrogenated copolymer composition used in the present invention. For example, when the abrasion resistance of the hydrogenated copolymer composition obtained in Reference Example 4 was evaluated by the above-mentioned method, the decrease in volume of the composition after the abrasion repeated 10,000 times was as small as 0.02 ml, which means that the hydrogenated copolymer composition of Reference Example 4 had excellent abrasion resistance.

The hydrogenated copolymer compositions obtained in Reference Examples 1 to 4 were shaped into sheets 1 to 4, respectively. Specifically, each of sheets 1 to 4 was obtained by kneading the hydrogenated copolymer composition (kneading temperature: 140 to 150° C.) by a mixing roll, followed by compression molding by a calendar roll at a temperature of 160 to 170° C. Using the obtained sheets 1 to 4, the calendar molding property of each of the compositions of Reference Examples 1 to 4 was evaluated by the above-mentioned method. As a result, it was found that each of the compositions of Reference Examples 1 to 4 had excellent roll bank property, so that the calendar molding property of each of the compositions of Reference Examples 1 to 4 was excellent.

REFERENCE EXAMPLE 5

A hydrogenated copolymer composition was produced in substantially the same manner as in Reference Example 3, except that hydrogenated copolymer (I)-2 was used instead of hydrogenated copolymer (I)-1. The properties of the produced hydrogenated copolymer composition were evaluated. As a result, it was found that the hydrogenated copolymer composition had excellent properties which are aimed at by the present invention.

The hydrogenated copolymer composition obtained in Reference Examples 5 was shaped into sheet 5. Specifically, sheet 5 was obtained by kneading the hydrogenated copolymer composition (kneading temperature: 140 to 150° C.) by a mixing roll, followed by compression molding by a calendar roll at a temperature of 160 to 170° C. Using the obtained sheet 5, the calendar molding property of the composition of Reference Example 5 was evaluated by the above-mentioned method. As a result, it was found that the composition of Reference Example 5 had excellent roll bank property, so that the calendar molding property of the composition of Reference Example 5 was excellent.

REFERENCE EXAMPLE 6

A hydrogenated copolymer composition was produced in substantially the same manner as in Reference Example 3, except that hydrogenated copolymer (I)-3 was used instead of hydrogenated copolymer (I)-1. The properties of the produced hydrogenated copolymer composition were evaluated. As a result, it was found that the hydrogenated copolymer composition had excellent properties which are aimed at by the present invention.

The hydrogenated copolymer composition obtained in Reference Examples 6 was shaped into sheet 6. Specifically, sheet 6 was obtained by kneading the hydrogenated copolymer composition (kneading temperature: 140 to 150° C.) by a mixing roll, followed by compression molding by a calendar roll at a temperature of 160 to 170° C. Using the obtained sheet 6, the calendar molding property of the composition of Reference Example 6 was evaluated by the above-mentioned method. As a result, it was found that the composition of Reference Example 6 had excellent roll bank property, so that the calendar molding property of the composition of Reference Example 6 was excellent.

REFERENCE EXAMPLES 7 TO 11 AND REFERENCE COMPARATIVE Examples 1 to 2

In each of Reference Examples 7 to 11 and Reference Comparative Examples 1 to 2, a hydrogenated copolymer composition was produced as follows. The components indicated in Table 3 were kneaded (kneading temperature: 130 to 140° C.) by a kneader, thereby obtaining a hydrogenated copolymer composition. As a lubricant, zinc stearate was added to the hydrogenated copolymer composition in an amount of 1 part by weight, relative to 100 parts by weight of the total of components (I) to (III). With respect to the hydrogenated copolymer composition of Reference Example 8, 25 parts by weight of short polyurethane fibers were added thereto, relative to 100 parts by weight of the total of components (I) to (III). In each of Reference Examples 7 to 11 and Reference Comparative Examples 1 to 2, the obtained hydrogenated copolymer composition was subjected to compression molding to produce a sheet (test specimen) having a thickness of 2 mm, and the properties of the test specimen were measured by the above-mentioned methods. The results are shown in Table 4.

The hydrogenated copolymer compositions obtained in Reference Examples 7 to 11 and Reference Comparative Examples 1 to 2 were shaped into sheets 7 to 11 and comparative sheets 1 to 2, respectively. Specifically, each of sheets 7 to 11 and comparative sheets 1 to 2 was obtained by kneading the hydrogenated copolymer composition (kneading temperature: 140 to 150° C.) by a mixing roll, followed by compression molding by a calendar roll at a temperature of 160 to 170° C.

Using the obtained sheets 7 to 11 and comparative sheets 1 to 2, the calendar molding property of each of the compositions of Reference Examples 7 to 11 and Reference Comparative Examples 1 to 2 was evaluated by the above-mentioned method. As a result, it was found that each of the compositions of Reference Examples 7 to 11 had excellent roll bank property, so that the calendar molding property of each of the compositions of Reference Examples 7 to 11 was excellent.

In Reference Comparative Example 1, comparative sheet 1 was produced by the method of a Working Example of Unexamined Japanese Patent Application Laid-Open Specification No. 2002-96426, in which a laminate comprising a thermoplastic polymer composition is produced. Using comparative sheet 1, the hardness (at −10° C.) of the composition of Reference Comparative Example 1 was evaluated by the above-mentioned method. As a result, it was found that comparative sheet 1 had a disadvantageously high hardness. In addition, comparative sheet 1 had a poor roll bank property, so that distinct fisheyes were observed due to the non-uniformity in the thickness of the sheet. Thus, comparative sheet 1 exhibited a poor calendar-moldability.

In Reference Comparative Example 2, hydrogenated copolymer composition (I)-1 alone was molded into comparative sheet 2. With respect to the obtained comparative sheet 2, the surface touch, the moldability and the anti-blocking property were evaluated by the above-mentioned methods. As a result, it was found that comparative sheet 2 was excellent with respect to the surface touch and the moldability. However, the anti-blocking property of comparative sheet 2 was poor. Therefore, when comparative sheet 2 was rolled, the surface portions of the sheet which had contacted with each other got adhered to each other, so that the sheet became unusable.

EXAMPLE 1

Using the above-obtained modified conjugated diene polymer (i)-1 as modified conjugated diene polymer (i), an adhesive composition (1) was prepared as follows.

300 g of toluene was charged into a 1-liter reaction vessel equipped with a stirrer, followed by addition of 75 g of modified conjugated diene polymer (i)-1 which had been cut into fine pieces. The internal temperature of the reaction vessel was elevated to 50° C., followed by stirring, thereby completely dissolving modified conjugated diene polymer (i)-1. Subsequently, the internal temperature of the reaction vessel was elevated to 80° C. 17.7 g of polytetramethylene glycol having a molecular weight of 1,000 was charged into the reaction vessel, followed by stirring, thereby dissolving the polytetramethylene glycol. Then, 0.01 g of dibutyltin dilaurate was charged into the reaction vessel, followed by addition of 6.62 g of 4,4-dicyclohexyl diisocyanate over 15 minutes. Then, 60 g of toluene was charged into the reaction vessel and a reaction was effected for 1 hour while maintaining the temperature at 80° C. Subsequently, 0.68 g of 1,4-butanediol and 40 g of toluene were charged into the reaction vessel and a further reaction was effected for 1 hour, thereby obtaining adhesive composition (1).

The above-obtained adhesive composition (1) was uniformly applied to substrate cloth 1 by a roll bar, so as to form an adhesive layer having a uniform thickness of 0.1 mm. The substrate cloth having the adhesive layer formed thereon was placed in an oven having a temperature of 80° C., and maintained in the oven for 10 minutes, thereby volatilizing a solvent. On the resultant substrate cloth was laminated sheet 10 produced in Reference Example 10 through the adhesive layer, followed by heating by irradiating with infrared ray so that the surface temperature of the resultant laminate became 150 to 200° C., thereby obtaining a hydrogenated copolymer-containing laminate comprising sheet 10, adhesive composition (1) and substrate cloth 1. The adhesion strength of the hydrogenated copolymer-containing laminate was measured by the above-mentioned method. The result is shown in Table 5.

EXAMPLE 2

Adhesive composition (2) was produced in substantially the same manner as in Example 1, except that modified conjugated diene polymer (i)-2 was used instead of modified conjugated diene polymer (i)-1. Using adhesive composition (2), a hydrogenated copolymer-containing laminate comprising sheet 10, adhesive composition (2) and substrate cloth 1 was produced in substantially the same manner as in Example 1. The adhesion strength of the hydrogenated copolymer-containing laminate was measured by the above-mentioned method. The result is shown in Table 5.

EXAMPLE 3

Adhesive composition (3) was produced in substantially the same manner as in Example 1, except that modified conjugated diene polymer (i)-3 was used instead of modified conjugated diene polymer (i)-1. Using adhesive composition (3), a hydrogenated copolymer-containing laminate comprising sheet 10, adhesive composition (3) and substrate cloth 1 was produced in substantially the same manner as in Example 1. The adhesion strength of the hydrogenated copolymer-containing laminate was measured by the above-mentioned method. The result is shown in Table 5.

EXAMPLE 4

Adhesive composition (4) was produced in substantially the same manner as in Example 1, except that modified conjugated diene polymer (i)-4 was used instead of modified conjugated diene polymer (i)-1. Using adhesive composition (4), a hydrogenated copolymer-containing laminate comprising sheet 10, adhesive composition (4) and substrate cloth 1 was produced in substantially the same manner as in Example 1. The adhesion strength of the hydrogenated copolymer-containing laminate was measured by the above-mentioned method. The result is shown in Table 5.

COMPARATIVE EXAMPLE 1

Adhesive composition (5) was produced in substantially the same manner as in Example 1, except that unmodified conjugated diene polymer (i)-5 was used instead of modified conjugated diene polymer (i)-1. Using adhesive composition (5), a hydrogenated copolymer-containing laminate comprising sheet 10, adhesive composition (5) and substrate cloth 1 was produced in substantially the same manner as in Example 1. The adhesion strength of the hydrogenated copolymer-containing laminate was measured by the above-mentioned method. As a result, it was found that the hydrogenated copolymer-containing laminate had a low adhesion strength, so that the hydrogenated copolymer-containing laminate cannot be used as the hydrogenated copolymer-containing laminate of the present invention. The result is shown in Table 5.

EXAMPLE 5

A hydrogenated copolymer-containing laminate comprising sheet 7, adhesive composition (1) and substrate cloth 1 was produced in substantially the same manner as in Example 1, except that sheet 7 was used instead of sheet 10. The adhesion strength of the hydrogenated copolymer-containing laminate was measured by the above-mentioned method. The result is shown in Table 5.

EXAMPLE 6

A hydrogenated copolymer-containing laminate comprising sheet 10, adhesive composition (1) and substrate cloth 2 was produced in substantially the same manner as in Example 1, except that substrate cloth 2 was used instead of substrate cloth 1. The adhesion strength of the hydrogenated copolymer-containing laminate was measured by the above-mentioned method. The result is shown in Table 5.

EXAMPLE 7

A hydrogenated copolymer-containing laminate comprising sheet 10, adhesive composition (1) and substrate cloth 3 was produced in substantially the same manner as in Example 1, except that substrate cloth 3 was used instead of substrate cloth 1. The adhesion strength of the hydrogenated copolymer-containing laminate was measured by the above-mentioned method. The result is shown in Table 5.

EXAMPLE 8

A hydrogenated copolymer-containing laminate was produced in substantially the same manner as in Example 1, except that a composition obtained by adding to adhesive composition (1) a tris(p-isocyanatophenyl)thiophosphate-containing polyisocyanate type crosslinking agent (Desmodur RFE; manufactured and sold by Bayer AG, Germany) (hereinafter, referred to as "crosslinking agent-1") in an amount of 5 parts by weight, relative to 100 parts by weight of the modified copolymer, was used instead of adhesive composition (1). The adhesion strength of the hydrogenated copolymer-containing laminate was measured by the above-mentioned method. The result is shown in Table 5.

EXAMPLE 9

A hydrogenated copolymer-containing laminate was produced in substantially the same manner as in Example 1, except that a composition obtained by adding to adhesive composition (1) trichloroisocyanuric acid in an amount of 5 parts by weight, relative to 100 parts by weight of the modified copolymer, was used instead of adhesive composition (1). The adhesion strength of the hydrogenated copolymer-containing laminate was measured by the above-mentioned method. The result is shown in Table 5.

EXAMPLE 10

A hydrogenated copolymer-containing laminate was produced in substantially the same manner as in Example 1, except that a composition obtained by mixing 100 parts by weight of modified conjugated diene polymer (i)-6 and 5 parts by weight of crosslinking agent-1 was used instead of adhesive composition (1). The adhesion strength of the hydrogenated copolymer-containing laminate was measured by the above-mentioned method. The result is shown in Table 5.

EXAMPLES 11 TO 19

In each of Examples 11 to 19, a hydrogenated copolymer-containing laminate was produced in substantially the same manner as in Example 1, except that the components indicated in Table 6 were used. The surface touch, feeling at low temperatures and mechanical strength of the hydrogenated copolymer-containing laminates of Examples 11 to 19 were evaluated by the above-mentioned methods. As results, it was found that the hydrogenated copolymer-containing laminates of Examples 11 to 19 were excellent with respect to the surface touch, the feeling at low temperatures and the mechanical strength, so that the hydrogenated copolymer-containing laminates of Examples 11 to 19 can be used as artificial leathers. The results are shown in Table 6.

COMPARATIVE EXAMPLES 2 TO 4

In each of Comparative Examples 2 to 4, a hydrogenated copolymer-containing laminate was produced in substantially the same manner as in Example 1, except that comparative sheet 1, adhesive composition (1) and substrate cloths 1 to 3 were used in combination as indicated in Table 6. With respect to each of the hydrogenated copolymer-containing laminates of Comparative Examples 2 to 4, the feeling at low temperatures was evaluated by the above-mentioned method. As a result, it was found that the feeling of each of the hydrogenated copolymer-containing laminates of Comparative Examples 2 to 4 at low temperatures was not satisfactorily soft, so that the hydrogenated copolymer-containing laminates of Comparative Examples 2 to 4 cannot be used as artificial leathers.

EXAMPLE 20

A foamed layer-containing laminate was produced as follows. 25% by weight of hydrogenated copolymer (I)-1, 15% by weight of rubbery polymer-9, 15% by weight of rubbery polymer-7, 15% by weight of rubbery polymer-12, 20% by weight of thermoplastic resin-3 and 10% by weight of calcium carbonate (wherein each % by weight is based on the total weight of the components mentioned above) were kneaded (kneading temperature: 130 to 140° C.) by a kneader, thereby obtaining a hydrogenated copolymer composition. The obtained hydrogenated copolymer composition was kneaded (kneading temperature: 140 to 150° C.) by a mixing roll, followed by compression molding by a calendar roll at a temperature of from 160 to 170° C., thereby obtaining sheet 12 having a thickness of 0.4 mm. Separately, 70% by weight of rubbery polymer-12, 30% by weight of rubbery polymer-9 (wherein each % by weight is based on the total weight of the above-mentioned rubbery polymers), 3 parts by weight of a foaming agent, 0.5 part by weight of a auxiliary foaming agent and 1 part by weight of a lubricant (wherein each part by weight is relative to 100 parts by weight of the total of the above-mentioned rubbery polymers) were kneaded (kneading temperature: 130 to 140° C.) by a kneader, thereby obtaining a foaming agent-containing composition. The obtained foaming agent-containing composition was kneaded (kneading temperature: 140 to 150° C.) by a mixing roll, followed by compression molding by a calendar roll at a temperature of from 160 to 170° C., thereby obtaining sheet 13 having a thickness of 0.6 mm. To a roll provided at an outlet of the kneader used for the production of sheet 13 was supplied sheet 12 so as to laminate and heat seal sheet 12 and sheet 13 on each other, thereby obtaining a double-layer sheet. Subsequently, using the obtained double-layer sheet instead of sheet 10, a hydrogenated copolymer-containing laminate comprising the double-layer sheet, adhesive composition (1) and substrate cloth 1 was produced in substantially the same manner as in Example 1. The produced hydrogenated copolymer-containing laminate was subjected to heat treatment in a hot dryer having a temperature of from 190 to 200° C. so as to foam sheet 13, thereby obtaining a foamed layer-containing laminate. The flexibility of the foamed layer-containing laminate was measured by the above-mentioned method. As a result, it was found that the obtained foamed layer-containing laminate exhibited excellent flexibility and had excellent cushioning property.

EXAMPLE 21

A hydrogenated copolymer-containing laminate was produced in substantially the same manner as in Example 8, except that sheet 14 was used, which was produced from the same composition as that of Reference Example 10 except that hydrogenated copolymer (I)-4 was used instead of hydrogenated copolymer (I)-1. The surface touch and mechanical strength of the hydrogenated copolymer-containing laminate were evaluated by the above-mentioned methods. As a result, it was found that the hydrogenated copolymer-containing laminate had excellent surface touch and mechanical strength, so that the hydrogenated copolymer-containing laminate can be used as an artificial leather.

EXAMPLE 22

A hydrogenated copolymer-containing laminate was produced in substantially the same manner as in Example 8, except that sheet 15 was used, which was produced from the same composition as that of Reference Example 10 except that hydrogenated copolymer (I)-5 was used instead of hydrogenated copolymer (I)-1. The surface touch and mechanical strength of the hydrogenated copolymer-containing laminate were evaluated by the above-mentioned methods. As results, it was found that the hydrogenated copolymer-containing laminate had excellent surface touch and mechanical strength, so that the hydrogenated copolymer-containing laminate can be used as an artificial leather.

TABLE 1

| | | Formulation (part by weight) | | | |
| | | Composition of Reference Example 1 | Composition of Reference Example 2 | Composition of Reference Example 3 | Composition of Reference Example 4 |
|---|---|---|---|---|---|
| Component (I) | Hydrogenated copolymer (I)-1 | 25 | 40 | 72 | 85 |
| Component (II) | Rubbery polymer-1 | 35 | | | 15 |
| | Rubbery polymer-2 | 15 | | 28 | |
| | Rubbery polymer-3 | | 60 | | |
| | Rubbery polymer-4 | 25 | | | |
| | Rubbery polymer-9 | | 70 | | |
| | Rubbery polymer-10 | | 20 | | |
| | Total | 100 | 100 | 100 | 100 |
| Component (III) | Thermoplastic resin-1 | 15 | 30 | 20 | |
| | Thermoplastic resin-2 | 15 | | 30 | |
| | Thermoplastic resin-4 | | | | 25 |
| | Filler-1 | | 10 | | |

TABLE 2

| Properties | Reference Example 1 | Reference Example 2 | Reference Example 3 | Reference Example 4 |
|---|---|---|---|---|
| Hardness (room temperature) | 70 | 70 | 80 | 80 |
| 100% modulus (kg/cm$^2$) | 30 | 23 | 43 | 75 |
| Tensile strength (kg/cm$^2$) | 75 | 55 | 85 | 120 |
| Tensile elongation (%) | 900 | 930 | 750 | 550 |
| Impact resilience (%) | 45 | 42 | 30 | 20 |
| Surface touch | ○ | ○ | ◎ | ◎ |

TABLE 3

| | | Formulation (part by weight) | | | | | | |
| | Components | Composition of Reference Example 7 | Composition of Reference Example 8 | Composition of Reference Example 9 | Composition of Reference Example 10 | Composition of Reference Example 11 | Composition of Reference Comparative Example 1 | Composition of Reference Comparative Example 2 |
|---|---|---|---|---|---|---|---|---|
| Component (I) | Hydrogenated copolymer (I)-1 | 55 | 60 | 40 | 50 | 50 | | 100 |
| Component (II) | Rubbery polymer-5 | | | | | 30 | | |
| | Rubbery polymer-6 | | | | | | | |
| | Rubbery polymer-7 | | 40 | 20 | | | | |
| | Rubbery polymer-8 | 45 | | | | | | |
| | Rubbery polymer-9 | | | 20 | | | | |
| | Rubbery polymer-11 | | | | 20 | | | |
| | Rubbery polymer-12 | | | 20 | | | | |
| | Rubbery polymer-13 | | | | | | 50 | 100 |
| | Total | 100 | 100 | 100 | 100 | 100 | 100 | 100 |
| Component (III) | Thermoplastic resin-3 | | | | 30 | 20 | 50 | 100 |
| | Thermoplastic resin-4 | 10 | | | | | | |
| | Thermoplastic resin-5 | | 50 | | | | | |
| | Thermoplastic resin-6 | | | | 30 | | | |
| | Filler-2 | | 40 | | 15 | | | |

TABLE 4

| | | Reference Example 7 | Reference Example 8 | Reference Example 9 | Reference Example 10 | Reference Example 11 | Reference Comparative Example 1 | Reference Comparative Example 2 |
|---|---|---|---|---|---|---|---|---|
| Properties | Hardness (room temperature) | 80 | 85 | 67 | 72 | 75 | 80 | 68 |
| | Hardness (−10° C.) | 93 | 95 | 93 | 93 | 95 | 100 | 95 |
| | Tensile strength (kg/cm$^2$) | 105 | 185 | 165 | 200 | 210 | 250 | 130 |

TABLE 4-continued

|  |  | Reference Example 7 | Reference Example 8 | Reference Example 9 | Reference Example 10 | Reference Example 11 | Reference Comparative Example 1 | Reference Comparative Example 2 |
|---|---|---|---|---|---|---|---|---|
|  | Tensile elongation (%) | 550 | 700 | 750 | 550 | 560 | 700 | 400 |
|  | Tearing strength (kg/cm$^2$) | 50 | 45 | 55 | 45 | 50 | 60 | 30 |
|  | Surface touch | ◉ | ○ | ○ | ◉ | ○ | Δ | ◉ |
| Calender-mold-ability | Thickness of sheet (mm) | 0.4 | 0.15 | 0.2 | 0.25 | 0.2 | 0.2 | 0.2 |
|  | Moldability | ◉ | ○ | ○ | ◉ | ○ | x | ◉ |

TABLE 5

|  | Example 1 | Example 2 | Example 3 | Example 4 | Comparative Example 1 | Example 5 |
|---|---|---|---|---|---|---|
| Sheet Composition used for sheet | Sheet 10 Composition of Reference Example 10 | Sheet 10 Composition of Reference Example 10 | Sheet 10 Composition of Reference Example 10 | Sheet 10 Composition of Reference Example 10 | Sheet 10 Composition of Reference Example 10 | Sheet 7 Composition of Reference Example 7 |
| Type of adhesive composition | Adhesive composition (1) | Adhesive composition (2) | Adhesive composition (3) | Adhesive composition (4) | Adhesive composition (5) | Adhesive composition (1) |
| Modified conjugated diene polymer (i) used for forming adhesive layer | Modified conjugated diene polymer (i)-1 | Modified conjugated diene polymer (i)-2 | Modified conjugated diene polymer (i)-3 | Modified conjugated diene polymer (i)-4 | Modified conjugated diene polymer (i)-5 | Modified conjugated diene polymer (i)-1 |
| Substrate cloth | Substrate cloth 1 | Substrate cloth 1 | Substrate cloth 1 | Substrate cloth 1 | Substrate cloth 1 | Substrate cloth 1 |
| Adhesion strength (kgf/cm) | 1.4 | 2.1 | 1.7 | 2.3 | 0.6 | 1.6 |

|  | Example 6 | Example 7 | Example 8 | Example 9 | Example 10 |
|---|---|---|---|---|---|
| Sheet Composition used for sheet | Sheet 10 Composition of Reference Example 10 | Sheet 10 Composition of Reference Example 10 | Sheet 10 Composition of Reference Example 10 | Sheet 10 Composition of Reference Example 10 | Sheet 10 Composition of Reference Example 10 |
| Type of adhesive composition | Adhesive composition (1) | Adhesive composition (1) | 1) | 2) | 3) |
| Modified conjugated diene polymer (i) used for forming adhesive layer | Modified conjugated diene polymer (i)-1 | Modified conjugated diene polymer (i)-1 | Modified conjugated diene polymer (i)-1 | Modified conjugated diene polymer (i)-1 | Modified conjugated diene polymer (i)-6 |
| Substrate cloth | Substrate cloth 2 | Substrate cloth 3 | Substrate cloth 1 | Substrate cloth 1 | Substrate cloth 1 |
| Adhesion strength (kgf/cm) | 1.3 | 1.2 | 2.4 | 2.7 | 2.0 |

Note:
1) A composition obtained by adding to adhesive composition (1) crosslinking agent-1 in an amount of 5 parts by weight (relative to 100 parts by weight of a modified copolymer) was used.
2) A composition obtained by adding to adhesive (1) trichloroisocyanuric acid in an amount of 5 parts by weight (relative to 100 parts by weight of a modified copolymer) was used.
3) A composition obtained by mixing 100 parts by weight of modified conjugated diene polymer (i)-6 and 5 parts by weight of crosslinking agent-1 was used.

TABLE 6

|  | Example 11 | Example 12 | Example 13 | Example 14 | Example 15 | Example 16 | Example 17 |
|---|---|---|---|---|---|---|---|
| Sheet Composition used for sheet | Sheet 1 Composition of Reference Example 1 | Sheet 2 Composition of Reference Example 2 | Sheet 3 Composition of Reference Example 3 | Sheet 4 Composition of Reference Example 4 | Sheet 8 Composition of Reference Example 8 | Sheet 9 Composition of Reference Example 9 | Sheet 5 Composition of Reference Example 5 |
| Adhesive composition | Adhesive composition (1) | Adhesive composition (1) | Adhesive composition (1) | Adhesive composition (1) | Adhesive composition (1) | Adhesive composition (1) | Adhesive composition (2) |
| Substrate cloth | Substrate cloth 1 | Substrate cloth 1 | Substrate cloth 1 | Substrate cloth 1 | Substrate cloth 2 | Substrate cloth 2 | Substrate cloth 2 |
| Soft feeling at low temperatures | ○ | ○ | ○ | ○ | ○ | ○ | ○ |

|  | Example 18 | Example 19 | Comparative Example 2 | Comparative Example 3 | Comparative Example 4 |
|---|---|---|---|---|---|
| Sheet | Sheet 6 | Sheet 8 | Comparative Example sheet 1 | Comparative Example sheet 1 | Comparative Example sheet 1 |

TABLE 6-continued

| Composition used for sheet | Composition of Reference Example 6 | Composition of Reference Example 8 | Composition of Reference Comparative Example 1 | Composition of Reference Comparative Example 1 | Composition of Reference Comparative Example 1 |
|---|---|---|---|---|---|
| Adhesive composition | Adhesive composition (3) | Adhesive composition (3) | Adhesive composition (1) | Adhesive composition (1) | Adhesive composition (1) |
| Substrate cloth | Substrate cloth 2 | Substrate cloth 3 | Substrate cloth 1 | Substrate cloth 2 | Substrate cloth 3 |
| Soft feeling at low temperatures | ○ | ○ | x | x | x |

INDUSTRIAL APPLICABILITY

The hydrogenated copolymer-containing laminate of the present invention has various excellent properties which are equivalent to or higher than those of a vinyl chloride resin sheet. Specifically, the hydrogenated copolymer-containing laminate of the present invention has excellent properties with respect to flexibility, calendar-moldability, soft feeling at low temperatures (i.e., low temperature property), anti-blocking property (i.e., resistance to adhesion phenomena (which is generally referred to as "blocking") wherein when, for example, stacked resin shaped articles or a rolled resin film (which have or has resin surfaces which are in contact with each other) are or is stored for a long time, unfavorably strong adhesion occurs between the resin surfaces, so that it becomes difficult to separate the resin surfaces from each other), heat resistance, abrasion resistance, scratch resistance, impact resilience and the like. Therefore, the hydrogenated copolymer-containing laminate of the present invention can be advantageously used as a substitute for a vinyl chloride resin sheet. For example, the hydrogenated copolymer-containing laminate of the present invention can be advantageously used as artificial leathers (especially, skins for furniture, materials for interior of automobiles, shoe uppers, materials for bags, and skins for building materials).

The invention claimed is:

1. A hydrogenated copolymer-containing laminate sheet or film comprising:
   a substrate layer comprising a fibrous material,
   an adhesive layer, and
   a hydrogenated copolymer composition layer which is laminated on and bonded to said substrate layer through said adhesive layer,
   said hydrogenated copolymer composition layer comprising:
   10 to 90 parts by weight of a hydrogenated copolymer (I), and
   90 to 10 parts by weight of a rubbery polymer (II) exclusive of said hydrogenated copolymer (I),
   the total of said hydrogenated copolymer (I) and said rubbery polymer (II) being 100 parts by weight,
   wherein said hydrogenated copolymer (I) is obtained by hydrogenating a copolymer comprising conjugated diene monomer units and vinyl aromatic monomer units, a part of said vinyl aromatic monomer units optionally forming at least one vinyl aromatic polymer block (A),
   said hydrogenated copolymer (I) having the following characteristics (1) to (5):
   (1) a vinyl aromatic monomer unit content of from more than 50% by weight to 90% by weight, based on the weight of said hydrogenated copolymer (I),
   (2) a content of said vinyl aromatic polymer block (A) of not more than 40% by weight, based on the weight of said hydrogenated copolymer (I),
   (3) a weight average molecular weight of from 50,000 to 1,000,000, and
   (4) a hydrogenation ratio of 70% or more, as measured with respect to the double bonds in said conjugated diene monomer units, and
   (5) at least one glass transition temperature in the range of from −20° C. to 80° C.,
   said rubbery polymer (II) being at least one polymer selected from the group consisting of:
   (II-1) an unhydrogenated block copolymer comprising conjugated diene monomer units and vinyl aromatic monomer units, said unhydrogenated block copolymer having at least one glass transition temperature in the range of from −80° C. to lower than −25° C.,
   (II-2) a conjugated diene homopolymer having at least one glass transition temperature in the range of from −80° C. to lower than −25° C., or a hydrogenation product thereof,
   (II-3) a hydrogenated copolymer obtained by hydrogenating a random or block copolymer comprising conjugated diene monomer units and vinyl aromatic monomer units, said hydrogenated copolymer having a vinyl aromatic monomer unit content of 50% by weight or less, based on the weight of said hydrogenated copolymer, and at least one glass transition temperature in the range of from −80° C. to lower than −25° C.,
   (II-4) a block copolymer consisting of at least one vinyl aromatic homopolymer block having a weight average molecular weight of from 2,500 to 40,000, and at least one isoprene homopolymer block having a vinyl bond content of 40% or more, or a hydrogenation product thereof, wherein said at least one vinyl aromatic homopolymer block and said at least one isoprene homopolymer block are arranged in any order,
   said block copolymer (II-4) having a vinyl aromatic monomer unit content of 50% by weight or less, based on the weight of said block copolymer (II-4), a weight average molecular weight of from 20,000 to 200,000 and at least one glass transition temperature in the range of from −25° C. to 20° C., and
   (II-5) a rubbery olefin polymer having at least one glass transition temperature in the range of from −80° C. to lower than −25° C.,
   wherein said glass transition temperature of each of said hydrogenated copolymer (I) and polymers (II-1) to (II-5) is a temperature at which a peak of loss tangent (tan δ) is observed in a dynamic viscoelastic spectrum of the polymer.

2. The laminate according to claim 1, wherein said hydrogenated copolymer (I) has at least one substituent having at least one functional group selected from the group consisting of a hydroxyl group, an epoxy group, an amino group, a carboxyl group, an acid anhydride group, a silanol group and an alkoxysilane group.

3. The laminate according to claim 1, wherein said adhesive layer comprises:

100 parts by weight of a modified conjugated diene polymer (i) having bonded thereto at least one substituent having at least one functional group selected from the group consisting of a hydroxyl group, an epoxy group, an amino group, a carboxyl group, an acid anhydride group, a silanol group and an alkoxysilane group; and at least one reactive substance (ii) selected from the group consisting of:

13 to 95 parts by weight of a composition (ii-1) comprising:

10 to 60 parts by weight of a polyol having 3 or more hydroxyl groups, 3 to 30 parts by weight of a diisocyanate, and 0 to 5 parts by weight of a diol; and 0.1 to 20 parts by weight of a compound (ii-2) having at least 2 functional groups which are reactive to said functional group of said modified conjugated diene polymer (i), with the proviso that, when the functional group of the substituent bonded to the modified conjugated diene polymer (i) is other than an acid anhydride group, said compound (ii-2) has at least 3 functional groups which are reactive to said functional group of said modified conjugated diene polymer (i).

4. The laminate according to claim 3, wherein said adhesive layer comprises said composition (ii-1) as reactive substance (ii), and is obtained by a method comprising:

(1) mixing 10 to 60 parts by weight of a polyol having 3 or more hydroxyl groups with 100 parts by weight of a modified conjugated diene polymer (i) having bonded thereto at least one substituent having at least one functional group selected from the group consisting of a hydroxyl group, an epoxy group, an amino group, a carboxyl group, an acid anhydride group, a silanol group and an alkoxysilane group, to thereby obtain a mixture;

(2) reacting the mixture obtained in step (1) with 3 to 30 parts by weight of a diisocyanate to obtain a reaction mixture; optionally (3) reacting the reaction mixture obtained in step (2) with up to 5 parts by weight of a diol to obtain a reaction mixture; and (4) applying the reaction mixture obtained in step (2) or (3) to a substrate comprising a fibrous material.

5. The laminate according to claim 1, wherein said fibrous material is at least one member selected from the group consisting of a synthetic fiber, a natural fiber, a regenerated fiber and a multicomponent fiber.

6. The laminate according to claim 1, wherein at least a part of said hydrogenated copolymer composition layer is foamed.

7. The laminate according to any one of claims 1 to 6, which is a surface material of a furniture.

8. The laminate according to any one of claims 1 to 6, which is an interior part of a vehicle.

9. The laminate according to any one of claims 1 to 6, which is a shoe upper.

10. The laminate according to any one of claims 1 to 6, which is a part of a bag.

11. The laminate according to any one of claims 1 to 6, which is a building material.

* * * * *

UNITED STATES PATENT AND TRADEMARK OFFICE
CERTIFICATE OF CORRECTION

| | |
|---|---|
| PATENT NO. | : 7,807,241 B2 |
| APPLICATION NO. | : 10/556912 |
| DATED | : October 5, 2010 |
| INVENTOR(S) | : Masahiro Sasagawa et al. |

Page 1 of 1

It is certified that error appears in the above-identified patent and that said Letters Patent is hereby corrected as shown below:

Column 1, Line 6 delete "Japanese." and insert --Japanese--, therefor.

Column 57, Line 67 in Claim 1, delete "(1)," and insert --(I),--, therefor.

Column 58, Line 18 in Claim 1, after "1,000,000," delete "and".

Column 58, Line 45 (Approx.) in Claim 1, delete "haying" and insert --having--, therefor.

Signed and Sealed this
Eleventh Day of January, 2011

David J. Kappos
*Director of the United States Patent and Trademark Office*